United States Patent [19]

Raike

[11] Patent Number: 5,799,088
[45] Date of Patent: Aug. 25, 1998

[54] NON-DETERMINISTIC PUBLIC KEY ENCRYPTON SYSTEM

[76] Inventor: William Michael Raike, 66 Simpson Road, Swanson, Auckland, New Zealand

[21] Appl. No.: 656,185
[22] PCT Filed: Dec. 1, 1994
[86] PCT No.: PCT/NZ94/00136
§ 371 Date: Sep. 23, 1996
§ 102(e) Date: Sep. 23, 1996
[87] PCT Pub. No.: WO95/15633
PCT Pub. Date: Jun. 8, 1995

[30] Foreign Application Priority Data

Dec. 1, 1993 [NZ] New Zealand .......................... 250337
Dec. 16, 1993 [NZ] New Zealand .......................... 250475
Jun. 9, 1994 [NZ] New Zealand .......................... 260712

[51] Int. Cl.$^6$ ............................................. H04K 1/00
[52] U.S. Cl. ............................................. 380/30; 380/46
[58] Field of Search ........................ 380/28, 30, 46

[56] References Cited

U.S. PATENT DOCUMENTS 4,165,444  8/1979  Gordon ........................... 380/30

FOREIGN PATENT DOCUMENTS 325238  6/1989  European Pat. Off. .

Primary Examiner—David C. Cain

[57] ABSTRACT

A non-deterministic public key encryption system whereby a public key is generated from a private key using mathematical operations equivalent to exponentiation in finite fields. Thus an attacker is required to compute logarithms over finite fields. Encryption involves generating a random initialization key (R) which is used to (1) exponentiate the message receiver's public key (E) to produce initial values (K) for a pseudorandom binary mixture generator, and to (2) compute an open key (Q) by exponentiating an initial known generator state ($a_0$). A ciphertext (C) is produced from plaintext (P) by clocking the mixture generator from the initial value (K) and combining the output keystream with the plaintext (P). The open key (Q) is attached to the ciphertext prior to transmission. Decryption involves extracting the open key (Q) and exponentiating this by the message receiver's private key (D) to compute (K) which is then used to set the initial value of a mixture generator. The mixture generator is clocked and its output keystream combined with the ciphertext (C) to produce plaintext (P). The invention may be implemented in special purpose hardware or in software for a general purpose processor.

19 Claims, 2 Drawing Sheets

⊕ — DENOTES MOD-2 ADDER (XOR GATE)
○ — DENOTES COMPLEMENTED (INVERTED) INPUT
⊐ — DENOTES LOGICAL AND GATE (MULTIPLICATION)

⊕ - DENOTES MOD-2 ADDER(XOR GATE)
o - DENOTES COMPLEMENTED (INVERTED) INPUT
⟫ - DENOTES LOGICAL AND GATE (MULTIPLICATION)

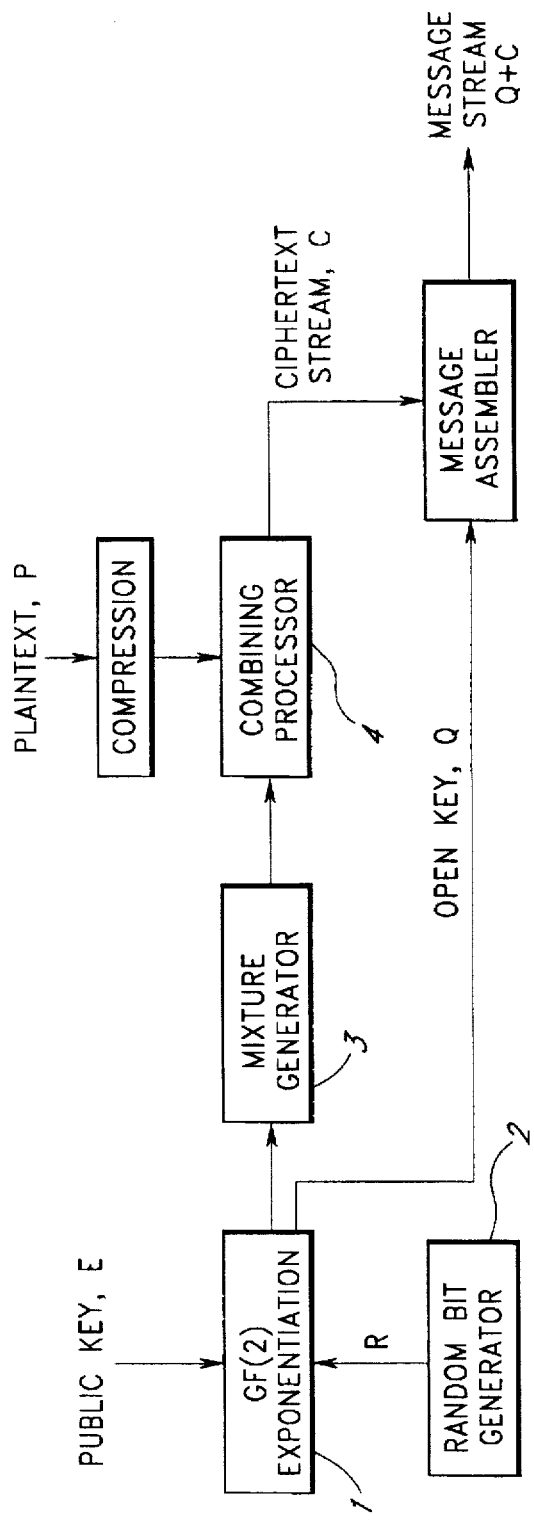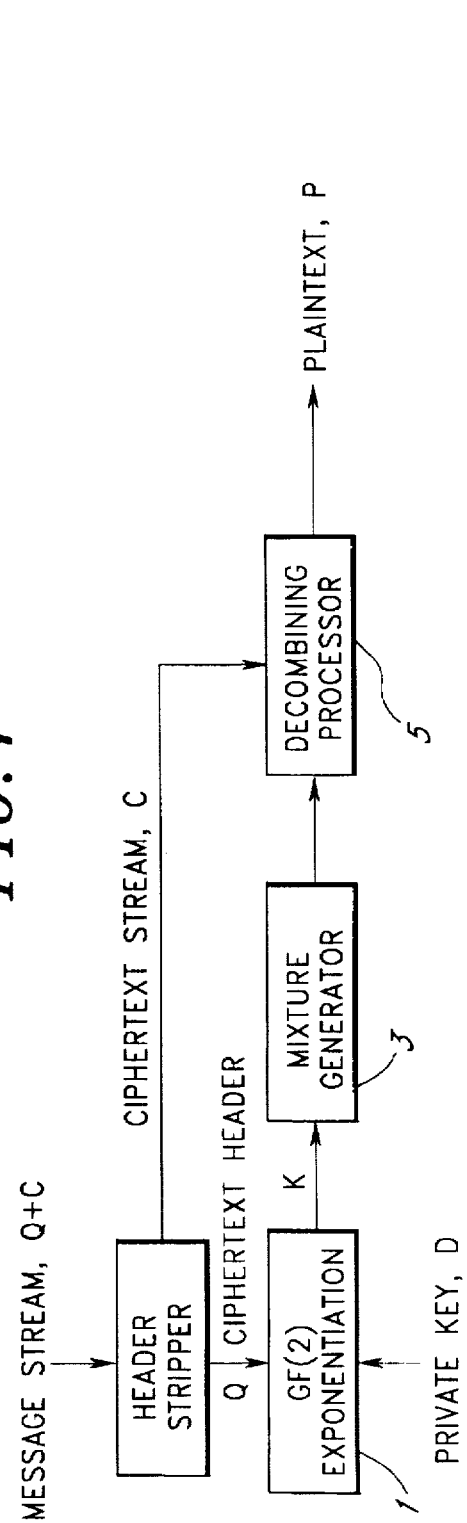

NON-DETERMINISTIC PUBLIC KEY ENCRYPTON SYSTEM

TECHNICAL FIELD

This invention relates to cryptographic systems and more particularly but not solely to a method and means for realising a computationally secure public-key encryption system and digital signature (authentication) system.

BACKGROUND ART

Data security is an increasingly important aspect in the design of modern communication systems. Encryption systems have been devised in an attempt to scramble or code a message so that to an observer (or "attacker"), the message being communicated appears nonsensical. Many encryption systems have utilised the idea of "keys" with which the message to be communicated is first encoded by the sender and then decoded by the receiver of the message. In this type of conventional encryption system there is the disadvantage that before a message can be decrypted by the intended recipient of the message, the sender of the message must first communicate, to the intended recipient, the decryption key. In addition, any change in the encryption key requires a corresponding change in the decryption key which must then be transmitted to the intended recipient. In the transmission or transportation of keys to the recipient there is always a danger than an observer or attacker will discover the key.

Public-key encryption systems have been developed in order to overcome this problem of the necessity to exchange keys. This type of system was introduced by Diffie and Hellman in 1976 in which each participant in the communication system has two keys, a public key which is made publicly available to all participants in the communication system and a private key which each participant keeps to himself. Each participant's private key is determined (either by choice or random selection) and from the private key the public key is generated. The public key can be thought of as the encryption key (E) while the private key may be thought of as the decryption key (D).

In public key encryption systems, the mathematical relationship which exists between the keys is often a "one-way function." That is, it is arranged that the public key may be relatively easily generated from the private key, however, determining the private key from the public key is computationally infeasible (that is, given an enormous quantity of computational resources, determination of the private key could probably not be effected within a lifetime).

In order for participant A to communicate a message M to a participant B in a public-key encryption system, user A first obtains user B's public key from a publicly available register or file and uses it to encrypt the message M. The ciphertext C is the result of encrypting the message M and is transmitted to user B who then transforms the ciphertext C using his own private key to obtain the message M.

To an observer or attacker wanting to discover the message M and who is aware of the public key and perhaps also has full knowledge of the cryptographic system, the private key (decryption key) must be determined from the known public key. As has been mentioned, the system relies upon the fact that this operation is extremely difficult to carry out. Alternatively, the attacker may have nothing but the intercepted encrypted message and a limited knowledge of the statistical properties of the message language.

An example of a public-key encryption system is disclosed in U.S. Pat. No. 4,405,829 to Rivest et al. The one-way function disclosed makes use of the fact that very large numbers are very hard to factorise. This system, however, has the disadvantage of requiring extensive multiplication of large (for example, 512-bit) integers, which is a very slow process. Another disadvantage of this system is that the encryption method used is completely deterministic, that is, if the same message is later sent to the same recipient, the identical ciphertext is produced, which can enable an attacker or eavesdropper to obtain significant information about message traffic being sent. A further disadvantage is that the system does not permit engineering trade-offs or compromises between speed and security, whereas it would be an advantage to be able to design a variety of types of cryptographic systems such as one with extremely high speed and moderate security, or one with moderately high speed and extremely high security. Yet another disadvantage is that the system is cumbersome to implement using very fast special purpose electronic devices as opposed to general-purpose digital computers.

Another desirable property of a secure communication system is the ability to conclusively prove that the participant indicated as being the originator of a message is the actual originator of the message. This is the so-called signature and authentication problem.

A prior example of a proposed public-key distribution system is disclosed in U.S. Pat. No. 4,200,770 to Hellman et al. However, the proposed system is a "key exchange" system rather than a true public-key encryption system. Hellman and Diffie also proposed a digital signature scheme in the paper "Privacy and Authentication: An Introduction to Cryptography," published in the Proceedings of the IEEE on page 401 of Volume 67, Number 3 of March 1979. In the signature system disclosed therein a participant A who wishes to send a message M to participant B first encrypts the message text M with his own private key, then encrypts this result with user B's public key to produce the ciphertext C which is transmitted to user B. User B then utilises his private key to transform the ciphertext to a form whereby a further transformation by user A's public key will produce the message text M. It can be seen that if the message is reproduced after this series of steps then the message must have come from user A.

One disadvantage of this system is that the encryption process must be performed twice by both the sender and receiver, adversely affecting the speed of the process. Another disadvantage is that it is necessary, in order to decrypt a message, to know the sender's public key, implying a heavy demand for access to the public key file. A further disadvantage is that the problem of managing the public key file is complicated by the possible need to retain and identify old public keys even after they may have been superseded. Yet another disadvantage is that the public key file is required to play a part in both privacy and authentication, whereas it would be an advantage to be able to separately manage information needed to accomplish these quite different functions.

DISCLOSURE OF INVENTION

It is, therefore, an object of the present invention to provide a complete public-key encryption system which will go some way towards overcoming the above disadvantages or which will at least provide industry with a useful choice.

Accordingly, in one aspect the invention consists in a public-key encryption system wherein a message sender encrypts a plaintext message using a publicly known key unique to a message receiver and the message receiver decrypts the encrypted message using a secret private key from which the public key has been derived, characterised in that:

(1) a private key (D) is selected which comprises a plurality of binary numbers $D_{1\ to\ n}$;

(2) a public key (E) is exponentiated using the private key by, for each of the said numbers $D_{1\ to\ n}$, calculating the state of a pseudo-random binary number generator from a given initial state after a number of clock pulses or state transitions equal to the corresponding number given by the private key $D_{1\ to\ n}$ and providing each of the calculated binary states $E_{1\ to\ n}$ as a component of the public key E;

(3) the message sender (a) selects a random initialisation key (R) comprising a set of binary numbers $R_{1\ to\ n}$ and exponentiates the initial state using each number by, for each of the numbers $R_{1\ to\ n}$, calculating the state of a pseudo-random binary number generator from a given initial state after a number of clock pulses or state transitions equal to the corresponding number given by the Random Initialisation Key $R_{1\ to\ n}$ and providing each of the calculated binary states $Q_{1\ to\ n}$ as a component of an open key Q.

(b) exponentiates the components of the public key E by the components of the random initialisation key R to produce generator initialisation states $K_{1\ to\ n}$ by, for each of the said numbers $E_{1\ to\ n}$ and $R_{1\ to\ n}$, calculating the state of a pseudo-random binary number generator that would result from applying the process defined in step (2) a number of times equal to the corresponding binary number $R_{1\ to\ n}$.

(c) loads a set (n) of pseudo-random binary number generators, the outputs of which are combined to form a mixture generator, with initial values $K_{1\ to\ n}$.

(d) clocks the mixture generator to obtain a keystream serial output and combines this output with the binary plaintext message to produce an encrypted bit stream.

(e) transmits the encrypted bit stream together with the open key Q to the message receiver;

(4) the message receiver (a) extracts the open key Q from the encrypted bit stream, (b) exponentiates the open key Q by the private key D to derive generator initialisation states $K_{1\ to\ n}$ by, for each of the said numbers $Q_{1\ to\ n}$ and $D_{1\ to\ n}$, calculating the state of a pseudo-random binary number generator that would result from applying the process defined in step (3)(a) a number of times equal to the corresponding binary number $D_{1\ to\ n}$.

(c) loads a second set (n) of pseudo-random binary number generators, the outputs of which are combined to form a mixture generator, with the generator initialisation states $K_{1\ to\ n}$.

(d) clocks the mixture generator to obtain a keystream serial output and combines this output with the received encrypted bit stream to produce the sender's plaintext message.

In a second aspect the invention consists in encryption apparatus for a public key encryption system in which a private key (D) is selected which comprises a plurality of binary numbers $D_{1\ to\ n}$ and a public key (E) is exponentiated using the private key by, for each of the said numbers $D_{1\ to\ n}$, calculating the state of a pseudo-random binary number generator from a given initial state after a number of clock pulses or state transitions equal to the corresponding number given by the private key $D_{1\ to\ n}$, and providing each of the calculated binary states $E_{1\ to\ n}$ as a component of the public key E, said apparatus comprising:

means for generating a random initialisation key (R) comprising a set of binary numbers $R_{1\ to\ n}$;

means for exponentiating the initial state using each number by, for each of the said numbers $R_{1\ to\ n}$, calculating the state of a pseudo-random binary number generator from a given initial state after a number of clock pulses or state transitions equal to the corresponding number given by the random initialisation key $R_{1\ to\ n}$ and providing each of the calculated binary states $Q_{1\ to\ n}$ as a component of an open key Q;

means for exponentiating the components of the public key E by the components of the random initialisation key R to produce generator initialisation states $K_{1\ to\ n}$ by, for each of the said numbers $E_{1\ to\ n}$ and $R_{1\ to\ n}$, calculating the state of a pseudo-random binary number generator that would result from applying the process used to exponentiate public key (E) a number of times equal to the corresponding binary number $R_{1\ to\ n}$;

a mixture generator comprising a set (n) of pseudo-random binary number generators, the outputs of which are combined to form the output of the mixture generator;

means which load said set (n) of pseudo-random binary number generators with initial values equal to $K_{1\ to\ n}$;

means which clock the mixture generator to obtain a keystream serial output;

means which receive a plaintext message and combine the output of the mixture generator with the binary plaintext message to produce an encrypted bit stream;

and means for transmitting the encrypted bit stream together with the open key Q to the message receiver.

In a third aspect the invention consists in decryption apparatus for a public-key encryption system in which a private key (D) is selected which comprises a plurality of binary numbers $D_{1\ to\ n}$ and a public key (E) is exponentiated using the private key by, for each of the said numbers $D_{1\ to\ n}$, calculating the state of a pseudo-random binary number generator from a given initial state after a number of clock pulses or state transitions equal to the corresponding number given by the private key $D_{1\ to\ n}$, and providing each of the calculated binary states $E_{1\ to\ n}$ as a component of the public key E, and wherein a plaintext message is encrypted according to a process whereby the message sender (1) selects a random initialisation key (R) comprising a set of binary numbers $R_{1\ to\ n}$ and exponentiates the initial state using each number by for each of the said numbers $R_{1\ to\ n}$, calculating the state of a pseudo-random binary number generator from a given initial state after a number of clock pulses or state transitions equal to the corresponding number given by the random initialisation key $R_{1\ to\ n}$ and providing each of the calculated binary states $Q_{1\ to\ n}$ as a component of an open key Q;

(2) exponentiates the components of the public key E by the components of the random initialisation key R to produce generator initialisation states $K_{1\ to\ n}$ by, for each of the said numbers $E_{1\ to\ n}$ and $R_{1\ to\ n}$, calculating the state of a pseudo-random binary number generator that would result from applying the process previously defined, wherein a private key is used to exponentiate a public key, a number of times equal to the corresponding binary number $R_{1\ to\ n}$;

(3) loads a set (n) of pseudo-random binary number generators, the outputs of which are combined to form a mixture generator, with initial values $K_{1\ to\ n}$;

(4) clocks the mixture generator to obtain a keystream serial output and combines this output with the binary plaintext message to produce an encrypted bit stream;

(5) transmits the encrypted bit stream together with the open key Q to the message receiver, said decryption apparatus comprising:

means for extracting the open key Q from the encrypted bit stream;

means for exponentiating open key Q by the private key D to derive generator initialisation states $K_{1 \text{ to } n}$ by, for each of the said numbers $Q_{1 \text{ to } n}$ and $D_{1 \text{ to } n}$, calculating the state of a pseudo-random binary number generator that would result from applying the process defined above for deriving the open key (Q) a number of times equal to the corresponding binary number $D_{1 \text{ to } n}$;

a set (n) of pseudo-random binary number generators, the outputs of which are combined to form a mixture generator;

means which load said set (n) of pseudo-random binary number generators with initial values equal to $K_{1 \text{ to } n}$;

means for clocking the mixture generator to obtain a keystream serial output;

and means for combining this output with the received encrypted bit stream to produce the plaintext message.

In a fourth aspect the invention consists in a public-key authentication system wherein a message sender appends signature information to a message and registers corresponding authentication information together with his name in a signature archive that is open to public inspection and wherein a message verifier obtains the message and its signature information, and the authentication information from the public signature archive and uses these to confirm whether or not the message has been sent by the sender identified by said signature information, characterised in that:

(1) the message sender
 (a) selects a random digital signature (S) consisting of a plurality of binary numbers $S_{1 \text{ to } n}$;
 (b) exponentiates a verification key V by, for each of said numbers $S_{1 \text{ to } n}$, by calculating the state of a pseudo-random binary number generator from a given initial state after a number of clock pulses or state transitions equal to the corresponding number given by the random digital signature $S_{1 \text{ to } n}$ and providing each of the calculated binary states $V_{1 \text{ to } n}$ as a component of the verification key V;
 (c) checks said signature archive to ensure that the verification key V computed in (b) has not yet been registered and if V has previously been registered repeats steps (a) and (b);
 (d) computes a generalised cyclic redundancy check (CRC) value C by, for each one of a set (n) of pseudo-random binary number generators, computing the remainder resulting from dividing the sequence of bits comprising the message being sent by a modulus corresponding to said pseudo-random binary number generator and providing each such remainder $C_{1 \text{ to } n}$ as a component of the generalised CRC value C;
 (e) computes the sum C+S (modulo 2) and registers this sum and the verification key V under his name in the public signature archive;
 (f) appends S to the message being sent, and (2) the message verifier
 (a) extracts the digital signature (S) consisting of a plurality of binary numbers $S_{1 \text{ to } n}$ from the message;
 (b) computes a generalised cyclic redundancy check (CRC) value C by, for each of the said numbers $S_{1 \text{ to } n}$, computing the remainder resulting from dividing the sequence of bits comprising the received message by a modulus corresponding to a pseudo-random binary number generator and providing each such remainder $C_{1 \text{ to } n}$ as a component of the generalised CRC value C;
 (c) computes a verification key V by, for each of said numbers $S_{1 \text{ to } n}$, exponentiating a given initial state of the corresponding pseudo-random binary number generator using each said number $S_{1 \text{ to } n}$ by means of the process defined in step (1)(b);
 (d) computes the sum C+S (modulo 2);
 (e) searches the public signature archive under the name of the sender identified by said signature information of the message for authentication information matching the values C+S (modulo 2) and V computed in (c) and (d);
 (f) validates the message as authentic if the search in (e) is successful, or rejects it as spurious if the search in (e) is unsuccessful.

In a fifth aspect the invention consists in a public-key authentication system wherein a message authenticator selects a private key D which comprises a plurality of binary numbers $D_{1 \text{ to } n}$ and exponentiates a public key E using the private key by, for each of the said numbers $D_{1 \text{ to } n}$, calculating the state of a pseudo-random binary number generator from a given initial state after a number of clock pulses or state transitions equal to the corresponding number given by the private key $D_{1 \text{ to } n}$ and providing each of the calculated binary states $E_{1 \text{ to } n}$ as a component of the public key E, and makes E available for public inspection, and wherein a message sender registers unique authentication information with said message authenticator and appends signature information to a message, and wherein a message verifier obtains the message, calculates a generalised CRC value for the message, submits the message signature information, the generalised CRC value and the sender's name or other identifying information to the message authenticator, and wherein said message authenticator uses said generalised CRC value, said message signature information and said registered authentication information to confirm whether or not the message has been sent by the sender identified by said authentication information, characterised in that:

(1) the message sender
 (a) selects an authentication password (P) consisting of a plurality of binary numbers;
 (b) requests said signature authenticator to register the authentication password P to correspond to his name or other identifying information and to confirm that P has not yet been registered by anyone and if informed that P has previously been registered repeats step (a);
 (c) computes a generalised cyclic redundancy check (CRC) value $C_M$ by, for each one of a set (n) of pseudo-random binary number generators, computing the remainder resulting from dividing the sequence of bits comprising the message being sent by a modulus corresponding to said pseudo-random binary number generator and providing each such remainder $C_{1 \text{ to } n}$ as a component of the generalised CRC value $C_M$;
 (d) computes intermediate signature information by appending the generalised CRC value $C_M$ to the authentication password P;

(e) computes message signature information $S_{P,M}$ by encrypting the intermediate signature information computed in step (d) using the signature authenticator's public key E by (i) selecting a random initialisation key (R) comprising a set of binary numbers $R_{1 \text{ to } n}$ and exponentiating the initial state using each number by, for each of the said numbers $R_{1 \text{ to } n}$, calculating the state of pseudo-random binary number generator from a given initial state after a number of clock pulses or state transitions given by the random initialisation key $R_{1 \text{ to } n}$ and providing each of the calculated binary states $Q_{1 \text{ to } n}$ to produce an open key Q, (ii) exponentiating the components of the signature authenticator's public key E by the components of the random initialisation key R to produce generator initialisation states $K_{1 \text{ to } n}$ by, for each of the said numbers $E_{1 \text{ to } n}$ and $R_{1 \text{ to } n}$, calculating the state of a pseudo-random binary number generator that would result from applying the process previously defined, wherein a private key is used to exponentiate a public key, a number of times equal to the corresponding binary number $R_{1 \text{ to } n}$.

(iii) loading a set (n) of pseudo-random binary number generators, the outputs of which are combined to form a mixture generator, with initial values $K_{1 \text{ to } n}$.

(iv) clocking the mixture generator to obtain a keystream serial output and combining this output with said intermediate signature information to produce encrypted intermediate signature information, (v) appending said encrypted intermediate signature information to said open key Q to produce message signature information $S_{P,M}$.

(f) appending the said message signature information $S_{P,M}$ to the message and also appending his name or other identifying information to the message.

(2) the message verifier (a) extracts the message signature information ($S_{P,M}$) and the sender's name or other identifying information from the message;

(b) computes a generalised CRC value $C'_M$ for the message by means of the process defined in step (1)(c);

(c) submits the said message signature information and the sender's name or other identifying information and the said generalised CRC value $C'_M$ to the signature authenticator and requests said signature authenticator to compare the authentication password P and generalised CRC value $C_M$ encrypted within the message signature information $S_{P,M}$ with $C'_M$ and the sender's name or other identifying information, and (3) the message authenticator (a) decrypts the message signature information $S_{P,M}$ using its private key D by (i) extracting the open key Q from the message signature information, (ii) exponentiating the open key Q by the private key D to derive generator initialisation states $K_{1 \text{ to } n}$ by, for each of the said numbers $Q_{1 \text{ to } n}$ and $D_{1 \text{ to } n}$, calculating the state of a pseudo-random binary number generator that would result from applying the process defined in step (1)(e)(i) a number of times equal to the corresponding binary number $D_{1 \text{ to } n}$.

(iii) loading a second set (n) of pseudo-random binary number generators, the outputs of which are combined to form a mixture generator, with the generator initialisation states $K_{1 \text{ to } n}$.

(iv) clocking the mixture generator to obtain a keystream serial output and combining this output with the message signature information to thereby recover the intermediate signature information P and C computed in step (1)(d);

(b) compares the value of P contained in said intermediate signature information with the authentication password registered as corresponding to the name or other identifying information submitted in step (2) (c);

(c) compares the value of $C_M$ contained in said intermediate signature information with the value of $C'_M$ submitted in step (2)(c);

(d) confirms to the message verifier that the message is authentic if both of the comparisons in steps (c) and (d) are successful, or rejects it as spurious if either comparison fails.

In a sixth aspect the invention consists in a method for generating random numbers comprising the steps of:

(1) a user manipulating an input device whose state at any time t can be described as a point $X_t$ represented by a plurality of coordinates $(X_{t1}, X_{t2}, \ldots X_{tm})$;

(2) measuring the points $X_t$ describing the states of said input device at a plurality of time instants t=1, 2, . . . , n;

(3) selecting a subset of the points thus measured corresponding to a subset of said time instants;

(4) computing a numerical function of the coordinates of all the points thus selected;

(5) obtaining the desired random numbers as the plurality of binary digits which represent the value of the numerical function thus computed.

In a seventh aspect the invention consists in a method of combining a serial keystream output with binary information P, comprising a succession of parts $P_1, \ldots, P_N$ in which each part $P_i$ represents a number of bytes $n_i$, to produce an encrypted bit stream C comprising a succession of parts $C_i$, said method comprising the steps of, for each successive part $P_i$:

(1) generating a pseudorandom permutation T of the bytes 1, . . . , $n_i$ using a plurality of bytes of the serial keystream output;

(2) permuting the relative positions of the bytes $n_i$ within the part $P_i$ according to the permutation T to form an intermediate part $I_i$;

(3) forming the i-th part $C_i$ of the encrypted bit stream by for each byte B of the intermediate part $I_i$;

(a) generating one or more bytes of the serial keystream output; and (b) replacing the byte B with a quantity that depends upon the byte B and the said generated byte or bytes of the serial keystream output.

In an eighth aspect the invention consists in a method of combining a serial keystream output with an encrypted bit stream C comprising a succession of parts $C_1, \ldots, C_N$, in which each part $C_i$ consists of a number of bytes $n_i$, to recover binary information P containing by a succession of parts $P_i$, said method comprising the steps of for each successive part $C_i$:

(1) generating a pseudorandom permutation T of the numbers 1, . . . $n_i$ using a plurality of bytes of the serial keystream output;

(2) forming an intermediate part $I_i$ by for each byte B of the part $C_i$ (a) generating one or more bytes of the serial keystream output; and (b) replacing the byte B with a quantity that depends upon the byte B and the said generated byte or bytes of the serial keystream output; and (3) permuting the relative positions of the bytes within the intermediate part $I_i$ according to the permutation T to form the i-th part $P_i$ of said binary information.

BRIEF DESCRIPTION OF DRAWINGS

FIG. 4 is a block diagram of a hardware realisation of an encrypter, and

FIG. 5 is a block diagram of a hardware realisation of a decrypter.

BEST MODES FOR CARRYING OUT THE INVENTION

Figure 1:
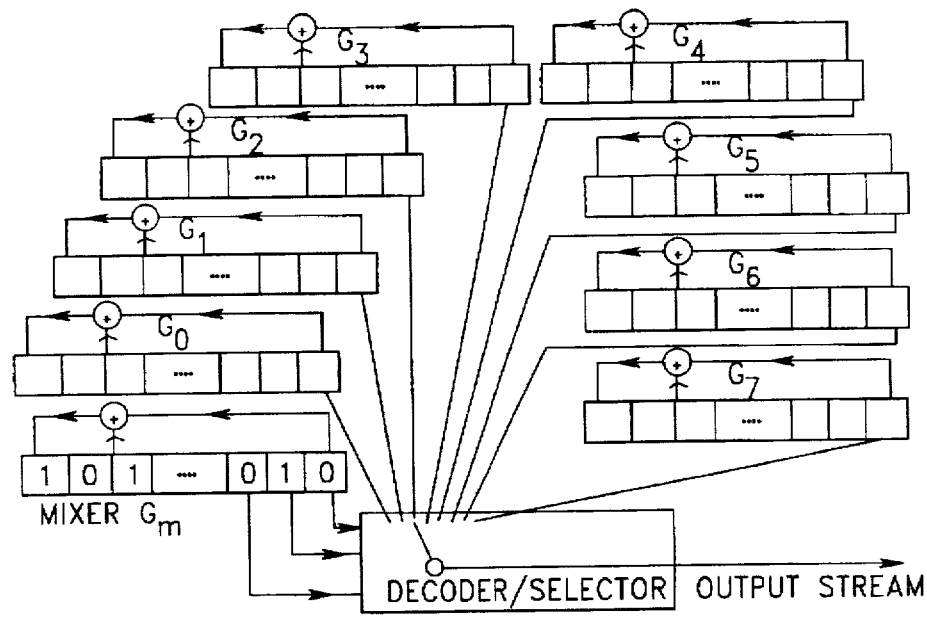
FIG. 1 is a diagrammatic representation of a mixture generator with MLSRG component generators which could be utilised to implement the present invention.

This description discloses a preferred embodiment of the present invention and also mentions several variations. The discussion in this document is from the viewpoint of implementation of the invention in software on a digital computer, but it should be noted that it is possible to implement all, or part, of the entire system using special purpose electronic hardware components. Such components include, but are not restricted to, logic elements such as LSI memories, shift registers, field-programmable gate arrays (FPGAs) and discrete logic.

1. Classification of the Present Invention

One way of classifying public-key cryptosystems, sometimes referred to as asymmetric-key systems, is according to the type of one-way function that relates private-key/public-key pairs, and more specifically according to the mathematical problem whose solution is required in order to invert the one-way function (i.e., to infer a private key from its public key). Three such problems account for virtually all public-key systems proposed to date: prime factorisation, discrete logarithms, and knapsacks. For example, the best-known public-key algorithm, RSA, is based on the difficulty of prime factorisation of large integers. Diffie-Hellman, which is a public key distribution system rather than a true public-key cryptosystem, is based on the discrete logarithm problem, as is the ElGamal public-key cryptosystem.

In mathematical terms, the present system is based upon the discrete logarithm problem. This means that in this system a public key is calculated from a private key using operations mathematically equivalent to exponentiation in finite fields. Consequently, breaking the system in the sense of computing a private key from its public key requires an attacker to compute logarithms over finite fields. For reasons of computational efficiency, simplicity and speed, as well as security, the finite fields underlying the present system are the Galois fields $GF[2^p]$, where in addition p is selected so that $2^p-1$ is a large prime (a "Mersenne" prime). As will be seen, the system involves exponentiation over more than one such field.

Another way of classifying cryptographic systems pertains to whether they are deterministic or non-deterministic. The first mention of non-deterministic cryptosystems is believed to be due to Carl Nicolai. Although the notion can be stated more or less precisely in a number of ways, one of the properties of a non-deterministic cryptosystem is that even if the same key is used to encrypt a given plaintext on more than one occasion, the resulting ciphertexts will differ in a non-systematic way, ideally in a truly random fashion. The present system is a non-deterministic cryptosystem.

In transforming plaintext into ciphertext, a cryptosystem may may increase or decrease the length of the original plaintext, or may leave it unchanged. The present system produces a ciphertext that is exactly the same length as the plaintext, except that it prefixes the ciphertext with a short header block. The length of this header block depends upon the parameters chosen for a particular implementation, but will typically be between 64 and 256 bytes. Its format is not critical.

2. Mixture Generators

Figure 2:
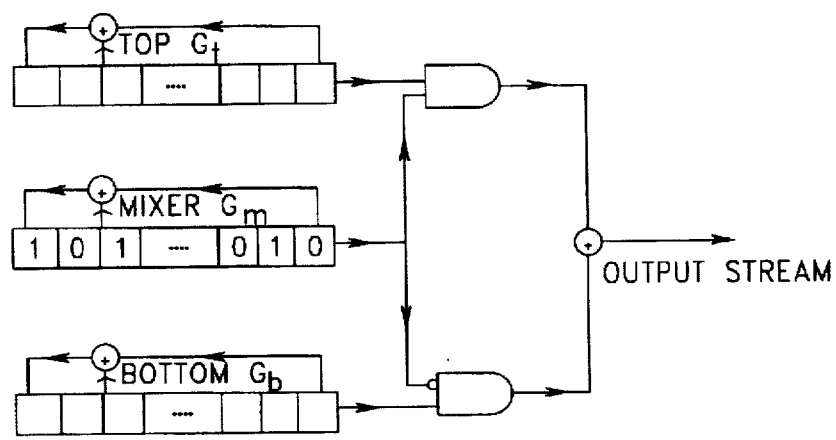
FIG. 2 is a diagrammatic representation of a preferred implementation of the mixture generator of FIG. 1, namely a Geffe-type generator.

The central component of the invention is a pseudorandom binary keystream generator of a new type referred to here as a mixture generator, by analogy with the concept, taken from probability theory, of a mixture of independent and identically distributed random variables. A mixture generator consists of a single pseudorandom binary generator, such as a maximal-period linear shift register generator (MLSRG) or a maximal-period multiplicative congruential generator (MCG), whose outputs or states are used to successively select, in a memoryless fashion, one member of a set of other component pseudorandom binary generators. FIG. 1 shows a mixture generator where the mixer generator $G_m$ is a maximal-period linear shift register whose last three stages at time T are used to select one of 8 other MLSRGs ($G_0, \ldots, G_i, \ldots, G_7$) whose output is to be used at time T. The clock rate of the mixer generator $G_m$ can be taken as three times the clock rate of the component generators $G_i$. A simpler example, shown in FIG. 2, is a special case of this and is known as a Geffe generator. In FIG. 2, the last stage of the mixer generator $G_m$ selects the output of the top generator $G_t$ if the mixer output at time T is a 1, or the output of the bottom generator $G_b$ if the mixer output at time T is a 0. More specifically, a concrete instance of this configuration is the case in which the mixer generator has 89 stages with (primitive) generator trinomial $1+x^{38}+x^{89}$, the top generator has 127 stages with (primitive) generator trinomial $1+x^{30}+x^{127}$, and the bottom generator has 521 stages with (primitive) generator trinomial $1+x^{168}+x^{521}$. A smaller (and less secure) instance is one in which the three generators correspond to the respective trinomials $1+x^{13}+x^{87}$, $1+x^{38}+x^{89}$, and $1+x^{30}+x^{127}$. When using MLSRGs as component generators, it is essential to use generators with the mathematical property that their generator polynomials are primitive polynomials. In addition, such generators may have the property that they have a prime number of stages, so that the lengths of their periods are Mersenne primes.

Throughout the balance of this document, the symbol p(x) is used to denote the generator polynomial corresponding to a MLSRG.

A mixture generator, as defined here, need not necessarily be restricted to component generators consisting of MLSRG or MCG components. Instead, the components, including the mixer, might well be mixture generators themselves, or nonlinear generators of other types with desirable statistical or cryptographic properties.

Mixture generators can be implemented in very fast special-purpose hardware, either using discrete logic or custom integrated circuits, or simulated in software on a general-purpose computer.

Since it is a finite-state device, starting from any particular state of its mixer and other component generators a mixture generator can be used to generate a periodic binary sequence (i.e., a sequence of zeroes and ones that will eventually repeat). The state of the generator is described by a collection of binary values specifying the state of each stage of each of its components.

The advantages of mixer generator configurations are that their periods are very long, their complexity is very high, their distribution of zeroes and ones is well-balanced, and successive outputs are substantially uncorrelated. Their outputs also have excellent statistical properties in terms of their n-tuple distribution and runs statistics. Some of these properties can be demonstrated mathematically, while others have been verified statistically (for example, using chi-square and runs tests).

Any periodic binary sequence is capable of being generated by some MLSRG, and one of the critical factors in assessing the suitability of a sequence for cryptographic purposes is the length of the shortest linear feedback shift register required to generate the sequence. A strong advantage of mixture generator configurations is that it is often easy to precisely characterise this length as a function of the mixer and component generator lengths, and that the length, which is a good measure of the complexity of the generator and consequently its usefulness for some cryptographic purposes, is very high.

The way in which mixture generators are used in the encryption system of the present invention will be described in terms of the Geffe-type mixture generator shown in FIG. 2. We denote the numbers of stages in the MLSRGs forming the mixer, top and bottom generators by $n_m$, $n_t$ and $n_b$, and the initial states (at time T=0) of the respective generators by $a_{m0}$, $a_{t0}$ and $a_{b0}$, respectively. We assume now for convenience that each of these initial states is fixed and publicly known. A variation of the invention consists of using the initial states as part of a key known only to a particular group of users in order to permit secure and authenticated transmission of messages among members of this group.

File encryption on personal computers using this type of mixture generator with $n_m=87$, $n_t=89$ and $n_b=127$ produces an extremely rapid system with a moderate security level. A much more secure system, still possible on a PC, results from the choice $n_m=89$, $n_t=127$ and $n_b=521$. The latter three all give rise to Mersenne primes.

It is possible to show mathematically that the period (i.e., the number of clock cycles after which the generator output repeats itself) of a Geffe-type generator is the product of the periods of the component generators: $(2^{n_m}-1)(2^{n_t}-1)(2^{n_b}-1)$. Its complexity, as measured by the number of stages in the shortest equivalent linear shift register generator which is able to produce the same output sequence, may be calculated by $n_m n_t + (1+n_m)n_b$. More complex mixture generators can also be analysed, with analogous results.

3. Using a Mixture Generator to Implement a One-Way Function

The very long binary sequence generated by a mixture generator has a number of useful properties. It is possible to actually run or "clock" the generator to obtain its output stream and its sequence of internal states. Since the generator's period is so long, it is not possible to generate more than a tiny segment of the entire output stream in any reasonable period of time no matter how fast the generator can be clocked; even for the smaller of the example generators mentioned above, the period length is on the order of $2^{303}$.

It is possible to use the mixture generator to rapidly and efficiently "calculate" what its final internal state would be if its individual components were clocked any given numbers of times, no matter how huge, starting from a known starting state.

It is, however, not computationally feasible to answer the inverse question. That is, given known final states for each component, it is extremely difficult to determine the numbers of times each of them would need to be clocked in order to reach such final states from known starting states. Answering this question is tantamount to solving a so-called "discrete logarithm" problem. The best known algorithm for solving such problems is the one due to D. Coppersmith, which is highly efficient. The time required to execute it on any conceivable computer can be estimated quite accurately. While it is practical to carry out the necessary calculations in a modest length of time on very fast computers in the case when the longest component generator is of length 127, this is not the case when the longest component generator length is above 500 or so. Solving such problems will remain computationally infeasible even under the most optimistic predictions concerning available computing power. Moreover, the difficulty of obtaining solutions can be accurately engineered by selecting generator lengths appropriately. Mixture generators incorporating components with lengths considerably higher than 500 are still efficient and practical to implement.

4. Private and Public Keys

In the present system, a private key is equivalent to a set of (binary) numbers which specify arbitrary numbers of times the components of the mixer generator are to be clocked. These can be interpreted as "distances" (measured in units of clock ticks) within the periodic output stream of each component.

The public key corresponding to a private key is the final state of the mixture generator that would result if each component were to be clocked a number of times given by the corresponding part of the private key.

A major distinction exists between the pairs of private keys and public keys used in this system and those used in most other systems. In many other systems, the key pairs must be generated together automatically at the same time, according to specific requirements and limitations. In the RPK system, the selection of a private key is completely free and unrestricted. It may be selected arbitrarily by its user, if desired, rather than being assigned. This is not only a significant practical advantage, but also forms a major point of difference between the RPK system and other patented techniques.

In the context of the illustrative Geffe generator, for purposes of selecting a private key a user A selects three numbers $D_m$, $D_t$ and $D_b$, where $D_m$ is in the range from 1 to $2^{n_m}-1$, $D_t$ is in the range from 1 to $2^{n_t}-1$ and $D_b$ is in the range from 1 to $2^{n_b}-1$. It should be noted that each of these ranges include the extreme values mentioned, although strictly speaking the high end of the range (all ones in binary) should be excluded since it is equal to the period. The public key for user A will consist of the states $E_m$, $E_t$ and $E_b$ of the three component generators after $D_m$, $D_t$ and $D_b$ clock cycles (shifts), respectively. For a mixture generator with, say, N component generators, the private and public keys will have N, rather than 3, such component states.

Note that the number of bits required to form either a private or public key is $n_m+n_t+n_b$, which is 303 in the case of the smaller Geffe configuration being used for an example and 737 for the larger one. One might wish to compare this with the 56 key bits employed in the widely-used DES conventional encryption algorithm.

The following description of efficient methods for computing the public key from any given private key is included for completeness and to aid in an understanding of the invention but should be apparent to a practitioner skilled in the art. For reasons based on the mathematics underlying the methods, it is appropriate to refer to the process of determining a public key from a given private key as exponentiation.

It should be obvious that a method is required for calculating the future state of a mixture generator, since in view of the extremely long period of such generators it is not possible to actually run them long enough to generate more than a tiny fraction of the number of states required. A highly compact and efficient method for calculating the future state of a linear feedback shift (MLSRG) register generator exists and depends upon interpreting the contents of the stages of the register (that is, its state) as coefficients of a polynomial in one "indeterminate" x. Since the register has n stages, the contents of the stages can represent the coefficients of the powers of $x:1,x, x^2, \ldots, x^{n-1}$. Note that such polynomials are different from the "generator polynomial" p(x) mentioned earlier, which is of degree n. It is convenient to renumber the stages of the generator from zero to n−1, where stage 0 corresponds to the stage immediately following the middle generator tap, so that stage (n−1) denotes the stage with the feedback tap in the middle of the generator. The final (output) stage of the generator will then be numbered (n−m−1), where m as before denotes the exponent in the middle term of the "generator polynomial" p(x).

Using this interpretation, it is possible to verify that the state resulting from clocking the generator once is equivalent to multiplying the polynomial representing its state by the polynomial consisting just of the single term x. This is to be done with the understanding first of all that all the arithmetic on the coefficients is done modulo 2 (i.e., 1+1=0, etc.), and second that the polynomial "product", if it is of degree n or higher, is understood to refer to the product modulo the generator polynomial p(x). This last statement means that any polynomial of degree n or higher is to be replaced by the remainder that would result after dividing it by p(x). Polynomial addition and multiplication and division follow the usual algebraic rules, except that in this case arithmetic on the coefficients is done modulo 2 (equivalent to XOR).

Taking this idea of multiplying polynomials modulo p(x) one step further, if the initial generator state $a_0$ is taken to be the one with a single 1 in the zero-numbered stage, then the process of advancing the generator by a time D (or clocking it D times) is equivalent to computing the product $1 \cdot x \cdot x \cdot x \cdot \ldots \cdot x$, where the factor x appears D times. The resulting product can be denoted as $x^D$ mod p(x). Using D as an exponent in this way suggests that an efficient method for computing $x^D$ mod p(x) involves pre-computing and tabulating the (n−1) polynomials representing the binary powers $1, x, x^2, x^4, x^8, \ldots, x^{2^k}, \ldots, x^{2^{n-1}}$, all modulo p(x), and then multiplying together (again, modulo p(x) each time) those corresponding to one bits in the binary representation of D.

This conceptual process of multiplying polynomials modulo p(x) can be accomplished in practice very simply and efficiently using the shift register itself. No elaborate actual multiplication is required. To see this, we observe that since clocking the generator once is equivalent to multiplying the polynomial corresponding to its contents by x, we can multiply by $x^j$, say, by clocking the generator j times. Multiplying by an arbitrary polynomial is accomplished simply by saving the states corresponding to such intermediate "multiples" (for example, in registers) and adding corresponding coefficients modulo 2 (that is, XOR-ing). This procedure eliminates the need for a separate procedure for polynomial division in reducing products modulo p(x). Designing special-purpose circuitry or chips to accomplish the entire process very quickly is a straightforward matter, or it can be emulated easily in software if desired.

5. Encryption

As stated above, the private key D for user A consists of three numbers $(D_m, D_t, D_b)$ while user A's public key E consists of the three numbers $(E_m, E_t, E_b)$ which are assumed to be publicly known, perhaps posted in a public directory file, and which represent the states of the corresponding generators at times $D_m$, $D_t$, and $D_b$ starting from given and known initial states $a_0=(a_{m0}, a_{t0}, a_{b0})$ at time zero. Equivalently, using D and E to denote times and states for a generic MLSRG, in polynomial notation we have $E=x^D$ mod p(x), assuming that the initial state corresponds to the zero-degree polynomial 1.

It is preferable that any plaintext message P to be encrypted has first undergone data compression. This is a well-known technique that is useful not only for reducing data transmission costs and/or storage space but which also decreases the redundancy of the underlying message. This increases the difficulty of successful cryptanalysis and also enhances the propagation of errors resulting either from transmission errors or from malicious modifications ("spoofing") of the ciphertext.

In order to encrypt a plaintext message P, so that it can only be decrypted by user A (using A's private key) another user B first generates a random initialisation key $R=(R_m, R_t, R_b)$ that is to be used solely during the encryption of P. R is analogous to D in that it represents "exponents" for the component generators, and the three components of R must fall in the same ranges as those of D. User B next computes $Q=(Q_m, Q_t, Q_b)$ from R in the same way that a public key E is computed from a private key D. That is, Q represents the states of the component generators at time R, starting from the initial state $a_0$. User B then includes Q in the ciphertext message header, to be transmitted or stored in the clear (that is, not encrypted) and which may also contain other information useful for communication purposes. For instance, a particular application might include addressing information, cyclic redundancy check (CRC) bytes or other error-correction data in the message header.

To continue the actual encryption process, user B next loads the component generators with an initial state consisting of E (user A's public key) and then again uses the same random initialisation key $R=(R_m, R_t, R_b)$ to compute a final state $K=(K_m, K_t, K_b)$ by "exponentiating" A's public key E, taking R as the exponent. In polynomial notation this can be written as $K_j=E_j^{R_j}$ mod p(x), for j=m, t, b. User B does this "exponentiation" of A's public key using the mixture generator's component shift registers to compute products of binary powers $E^{2^k}$ (k=0, 1, ..., n−1), analogous to the way that a public key is computed from a private key.

Note that user B has used both the random initialisation key R and user A's public key E in computing K, as well as publicly available knowledge of the initial state $a_0$ and the structure of the underlying mixture generator. The total computational effort has amounted only to the polynomial exponentiations required to advance the states of the component generators twice (that is, once to compute Q and once to compute K). The essential property of K for purposes of the present encryption system is that K describes the state resulting from advancing the generators first by D and then exponentiating this state by R (that is, the state that would be the result if the generator could be advanced by a time equal to R multiplied by D), despite the fact that user B has been able to compute K without knowing D.

The state K is used as a final generator initialisation state with which to begin creating the ciphertext. User B generates the body of the ciphertext C by using the keystream obtained by clocking (running) the mixture generator starting from the state K, operating with it and combining it with the plaintext bit stream P. This combining process must be invertible (that is, it must be possible to recover the plaintext P given K and C) and can be done in a variety of ways.

Although the simplest imaginable combining technique involves simply a bitwise XOR (exclusive-OR) between the plaintext and the keystream, this approach has serious cryptographic flaws when used by itself.

Many simple combining methods are possible. For instance, a block encryption system could be devised in which a fixed number L of keystream bits are combined with L plaintext bits by interpreting these two blocks of bits as integers in the range 0 to $2^L-1$ and defining the corresponding ciphertext block to be their product. This results in an encryption system somewhat analogous to the well-known El Gamal public-key cryptosystem. Unfortunately, it produces a ciphertext double the length of the plaintext.

The preferred combining method in the present system is one that produces a quasi-block cipher. In classical cryptographic terminology, this part of the algorithm can be compared to a running-key cipher combined with a pseudorandom transposition cipher. The idea is to first create an intermediate ciphertext block by utilising a part of the keystream (i.e., generator output) as a means for generating a pseudorandom permutation of the bytes (or even individual bits) of the plaintext block. One then combines the intermediate ciphertext block with a subsequent portion of the keystream, either on a bit-by-bit basis by XORing them together or on a byte-by-byte basis by performing substitution using a lookup table. This approach produces a ciphertext body whose length is the same as that of the plaintext. (Slightly different handling is required when the plaintext length is not an integral multiple of the block size, to accommodate the final partial block.)

An obvious refinement involves cascading this combining process by alternately applying the above-mentioned pseudorandom transposition (i.e., permutation) and substitution procedures more than once.

The only performance penalty associated with the preferred combining method is to increase the quantity of generator output required. However, since mixture generators run very quickly this is unlikely to be a significant issue except in applications requiring extremely high encryption bit rates. Additionally, in order to achieve the maximum possible degree of security it may be advisable, although not essential, to restrict the maximum length of any plaintext enciphered with a single random initialisation key R. This is not a major restriction, since very long plaintexts can simply be broken into a sequence of segments of acceptable size.

More complex ways of combining the keystream with the plaintext in order to achieve various objectives include variations on known techniques such as cipher block chaining. In one such variant, the plaintext is first broken into blocks of fixed size to which additional timing, authentication or error-correction information may be appended or prefixed. Each plaintext block is first XORed with the previous ciphertext block before combining it with the next block of the keystream.

When implementing the RPK system in software, it is useful to note that it is not difficult to clock the mixture generator 8 bits (or more) at a time, and the entire combining process can be accomplished accordingly. This can also be done in hardware without unacceptable complexity.

In summary, then, the encrytion process involves the following steps, all of which are accomplished using the mixture generator and its components:

Generate a random initialisation key R and use it to exponentiate the base state, thereby generating an open key Q which is included within a header, preceding the main body of the ciphertext.

Use R again to exponentiate the public key E, thereby generating a final (internal) generator initialisation state K.

Starting from the state K, run the mixture generator to obtain a keystream output and combine the keystream output with the plaintext P to obtain the main body of the ciphertext C.

Note that since R is chosen randomly, even if the same plaintext were to be encrypted again using the same public key the second ciphertext would differ randomly from the first one, both in the open key Q and in the ciphertext body itself since the final (internal) generator initialisation states would differ.

6. Combining Keystream with Plaintext

A novel preferred combining method will now be described that incorporates a number of the advanced approaches alluded to above. In what follows, we shall assume that the plaintext is represented as a sequence of 8-bit bytes, and we shall use the term "current CRC value" to refer to the 32-bit CCITT cyclic redundancy check value corresponding to the portion of the plaintext starting at the beginning and continuing up to any particular byte position within it. It should however be understood that this term could equally well refer to another type of CRC or message digest computation or even to a generalised CRC of the type mentioned later in this document. We shall also assume that it is convenient to process the plaintext, for combining purposes, in moderately large "chunks" that are presented as the contents of a buffer. A typical such chunk size might be in the order of two to four thousand bytes. Finally, we shall use the term "stuttered keystream" to refer to the output of a mixture generator modified so that the clocking of one or more of the component generators is made state-dependent. An easy way to do this is to sense the states of a particular set of generator stages and discard the generator output (that is, clock the generator an additional tick) if the states obey some criterion. For example, one can sense whether a particular set of four stages of a component contain all ones and clock this component an extra tick when this is so. It is well known that this procedure greatly increases the non-linearity, and hence complexity, of a keystream generator.

The general combining process is then as follows. First, compute the current CRC value of the plaintext up through the end of the current chunk. Second, use a portion of the stuttered keystream to generate a pseudorandom permutation of the bytes in the current chunk and then XOR the permuted data with subsequent consecutive bytes of the stuttered keystream. Finally, clock the stuttered keystream a number of bytes which depends upon the current CRC value, discarding the bytes thus generated; the number of bytes to discard might be given by, for example, simply the numerical value of the low-order byte of the current CRC value. This final step ensures that the portion of the keystream used for combining with any chunk depends both on the initial generator states and on the entire plaintext prior to that chunk and can thus be viewed as a type of cipher block chaining. It also ensures that any single-bit alteration or transmission error in the ciphertext causes a cascading of errors, averaging 50%, in subsequent chunks of decrypted text.

The manner of pseudorandomly permuting the data within a chunk can be varied as efficiency considerations may dictate. One economical approach involves viewing the chunk as a sequence of 256-byte blocks, possibly followed by a shorter end block if the chunk size is not a multiple of 256. As we shall demonstrate, we can then use 127 stuttered keystream bytes to generate one pseudorandom swap table to be used for all the 256-byte blocks, and a smaller additional number of stuttered keystream bytes to generate one smaller pseudorandom swap table, if necessary, to be used for the shorter end block. For the case of 256-byte blocks, such a pseudorandom swap table provides a set of 128 pairings (i, j) of distinct integers in the range 0 to 255. To use the swap table, one simply exchanges the positions of bytes i and j within the block for each (i, j) in the table. A key feature of this method is that it is essentially self-inverting, that is, applying the identical permutation a second time restores the original byte ordering. It is interesting to note that the total possible number of such swap tables, when the block size n is even, is given by:

$$\frac{n!}{2^{(n/2)}(n/2)!} = (n-1)(n-3)\ldots(3)(1)$$

A particularly simple algorithm for generating a swap table of size n is concisely described by the following fragment written in the C programming language:

```
typedef unsigned char BYTE;
BYTE stut_clock8(void);
#define MODULO   %
#define NOT_EQUAL   !=
void MakeSwapTable(int n, BYTE * table)
{
    int index, remaining, i, k;
    BYTE temp;
    for (i = 0; i < n; i++)
        table[i] = i;
    for (k = 0, remaining = n; remaining > 1;
    remaining = remaining - 2)
    {
        index = k + 1 + (stut_clock8( ) MODULO (remaining - 1);
        k = k + 1;
        if (index NOT_EQUAL k)
        {
            temp = table[index];
            table[index] = table[k];
            table[k] = temp;
        }
        k = k + 1;
    }
}
```

In the above code, the function stut_clock8( ) returns the next byte of the stuttered keystream. After it is executed, the table[ ] array will contain a sequence of consecutive pseudorandom pairs of the integers from 0 to n−1. (If n happens to be odd, the last table entry will designate a byte position which is not to be swapped.)

If a modest increase in computational overhead is acceptable, a somewhat more complex version of the above approach is possible in which a different pseudorandom swap table is used for each 256-byte block. In any case, it is worth emphasising here that the actual permutations applied are different for each encrypted message since a different (and randomly selected) portion of the keystream is used for each message.

Finally, although it does not constitute a part of the combining method discussed above, we point out here an additional feature of this approach that bears upon the issues of validation and authentication. Since a CRC value for the entire plaintext is available at the end of the encryption process, it is a relatively simple matter either to append this value to the plaintext and encrypt it as well, or to insert an encrypted version of it into the message header if desired. The resulting information can be used during decryption to detect whether the message has been altered during transmission. Summary measures other than the CRC or generalised CRC can be used here, and particular security requirements may suggest the use of alternatives such as the Rivest MD4 algorithm or the NIST Secure Hash Algorithm.

The following is an example of the preferred combining technique, in which the chunk size is taken (for simplicity) to be only 4 bytes:

Plaintext chunk: "ABCD" (whose hexadecimal representation is 41 42 43 44) Stuttered keystream output (hexadecimal): 37 04 FF B0 55

Encryption

1. Calculate the CCITT CRC32 value for the plaintext chunk. This value turns out to be DB 17 20 A5 (hexadecimal representation).

2. Generate a pseudorandom swap table using the first byte of the stuttered keystream (apply the procedure given by the C language fragment in the text):
    a) Initialise table to: 0 1 2 3.
    b) The first stuttered keystream byte 37, modulo 3, is 1, so permute the elements 1 and 2 in the table to produce a table of 0 2 1 3.
    c) The resulting swap table contains the pairs (0, 2) and (1, 3).

3. Permute the bytes ABCD by swapping the 0th and 2nd bytes, then the 1st and 3rd bytes, to produce CDAB, whose hexadecimal representation is 43 44 41 42. This is the permuted chunk.

4. XOR the permuted chunk byte-by-byte with the succeeding stuttered keystream bytes: 43 XOR 04=47, 44 XOR FF=BB, 41 XOR B0=F1, 42 XOR 55=37, so the ciphertext consists of the sequence of bytes (in hexadecimal) 47 BB F1 37.

5. The last byte of the CCITT CRC32 value is A5, which is equal to 165 in decimal, so we would then generate and discard 165 bytes of the stuttered keystream before encrypting the next chunk.

7. Decryption

To decrypt the received ciphertext, user A first uses the state given by the open key Q contained in the message header to compute the generator state corresponding to $Q^D$, where the exponent is his private key D. This process of exponentiating Q by D is done using the same kind of process used to exponentiate E by R during encryption. We observe that the resulting generator state is K, since Q represents the generator state after a time R starting from the base state $a_0$ and the state after time R·D is just K, as noted earlier. In polynomial notation this fact can be expressed as $E^R=(X^D)^R=K=(x^R)^D=Q^D$. Note that this means that the recipient has been able to compute K without the need to know the random initialisation key R generated for encryption. User A can then run the mixture generator starting from the final initialisation state K (that is, clock it through successive states) to obtain the keystream bits needed to invert (that is, undo) the combining process performed during encryption. Since the mixture generator is started from the state K for both encryption and decryption, the keystream output will be identical in both cases.

If the combining process used for encryption were to involve simply XORing the plaintext with the keystream, we note that XORing the resulting ciphertext with the same keystream again would recover the plaintext. For the preferred combining process described earlier, it is easy to invert the pseudorandom transposition and substitution operations in reverse order for each successive block to recover the ciphertext from the plaintext.

The specific steps required for decryption, referring to the preferred combining process discussed earlier, are:

1. Using the private key, exponentiate the open key Q contained in the ciphertext header to compute the final initialisation key K. The procedure for doing this is the same as the one used to exponentiate a public key by a random initialisation key during encryption. The state of the mixture generator will then be given by K.

2. For each block of the ciphertext body, run the mixture generator to obtain a part of the keystream output and use this to generate a pseudorandom permutation table.

3. Then run the mixture generator to obtain additional keystream output and combine it with the ciphertext block, either bit-by-bit by XORing the two together or byte-by-byte using a lookup table, to generate an intermediate text block. This step inverts the substitution process performed during encryption.

4. Apply the pseudorandom permutation defined by the permutation table created earlier to the intermediate text block. This step inverts the transposition process performed during encryption and produces a block of the original plaintext.

For the preferred combining method described earlier a slightly more complex process of inverting is necessary. The steps taken to initialise the generator are identical to those for the decryption of the simply combined ciphertext. However, the process of undoing the combination process involves, for each chunk, firstly the step of generating a representative pseudorandom permutation of a representative chunk corresponding to that needed to invert the permutation applied to the plaintext in the enciphering process, using the equivalent portion of the stuttered keystream. Secondly, XORing the current ciphertext chunk with the subsequent consecutive bytes of the stuttered keystream. This will produce a decrypted but pseudorandomly permuted version of the plaintext. Thirdly, the same permutation applied to the representative chunk is applied to the permuted version of the plaintext, to recover the plaintext. Lastly the current CRC value of the decrypted text, up to the end of the current chunk, is calculated, and the stuttered keystream is clocked a number of bytes dependent on the current CRC value. For the earlier example where the pseudorandom permutation was applied using a pseudorandom swap table to re-order the bytes of each 256 byte block of the chunk, the same swap table would be generated, before XORing the keystream with the ciphertext. Then the swap table, being self-inverting, would be used on the resulting deciphered but still permuted plaintext to recover the plaintext.

The following is an example of the preferred separating technique, corresponding to the earlier example of the preferred combining technique:

Decryption of the ciphertext 47 BB F1 37

1. Assuming the correct decryption key (private key) is available, the sequence of stuttered keystream bytes will be identical to that used for encryption: 37 04 FF B0 55.

2. Generate the pseudorandom swap table exactly as in the encryption process, using the first stuttered keystream byte. The table contains the pairs (0, 2) and (1, 3).

3. Before swapping, XOR the ciphertext with the succeeding bytes of the stuttered keystream: 47 XOR 04=43, BB XOR FF=44, F1 XOR B0=41, 37 XOR 55=42. The intermediate ciphertext is thus 43 44 41 42.

4. Apply the swap table by swapping first the 0th and 2nd bytes of the intermediate ciphertext and then the 1st and 3rd bytes: 41 42 43 44.

5. The result is 41 42 43 44, which is the hexadecimal representation of the ASCII string "ABCD", the correctly deciphered plaintext.

6. Calculate the CRC32 value for the plaintext up to this point. As before, its last byte is A5, so as before we generate and discard the next 165 bytes of the stuttered keystream before decrypting the next chunk.

8. Hardware Implementation

Although the present system is easy to implement in software, one of its outstanding advantages is its ability to be implemented in very fast special-purpose hardware. Very large scale integrated circuit technology is progressing so rapidly that any specific implementation details are soon out of date. However, off-the-shelf components do exist that provide some insight into the relative ease or difficulty, and achievable speed, of such an implementation. For example, special-purpose chips for performing exponentiation over $GF[2^n]$ do exit, such as the CA34C168 key management processor produced by Newbridge Microsystems, a Canadian company. It is a TTL-compatible CMOS device that operates at up to 16 MHz, and performs exponentiation over the field $GF[2^{593}]$. This chip has a throughput of 300 K bits/second. Despite the fact that this field is not necessarily ideal for the present system, these specifications give some idea of the rate at which public keys, open keys and final generator initialisation keys can be calculated. The same company produces the RBG 1210 random bit generator that produces a true random bit stream at 20K bits/second. Such a device would be suitable for generating the random initialisation keys R required here. Very long shift registers and discrete logic gates capable of operating at extremely high speeds are available off-the-shelf or can be easily integrated into custom chips or implemented as field-programmable gate arrays.

FIG. 4 shows a hardware implementation of an encrypter while FIG. 5 shows a hardware implementation of the decrypter process, both of which perform in hardware the functions previously described.

9. Signatures and Authentication

A major and important variant of the preceding approach allows the recipient of an encrypted message (user A in our terminology) to confirm that the received and decrypted plaintext originated from a specific source (that is, user B) and is not "forged." The requirement is to be able to append to a message a "signature" with the property that anyone is able to compare the signature with publicly available information in order to verify its origin, but that no one else is able to duplicate the signature. This requirement should be understood to also imply that it must not be possible to use signatures of previous messages to generate signatures for new or spurious messages. It is therefore essential that such a "digital signature" be message-dependent.

We remark here that an unstated assumption underlying any public-key encryption system is that the public file (containing the list of addressees and their public keys) must be secure against unauthorised modifications. If this were not the case, an intruder could replace someone else's public key with his own and thereby compromise the victim's security until the tampering was detected. The security of such public files against unauthorised tampering is usually provided by password systems or callback procedures, and sometimes by physical means.

Here we assume that a secure public signature archive exists that can hold appropriate information registered by individuals who wish to "sign" communications, and that this archive is available to inspection by anyone, but secure against the threat of modification by anyone other than a legitimate subscriber. We also assume that the security of this archive is such that a subscriber is able to append additional signature information to his own file but not to modify or delete existing information without leaving an adequate audit trail that permits system administrators to record and track such modifications. We remark that such precautions are not too different from those that must surround "specimen" signatures of the conventional variety.

We allow the possibility that the public signature archive may also be the same one that contains public key information for the encryption system, but note that the two files have different functions and probably different legal status. The costs and frequencies of modifications and accesses may also have different structures and different administrative requirements, suggesting that separating these two publicly-accessible files is advisable.

As background, we summarise the concept of a CRC (cyclic redundancy check) value for a message. CRC values are in common use as indicators of file and communications integrity, and various international standards (such as CCITT standards) exist. The CRC value of a message is a numerical value, typically either 16 or 32 bits long, computed from the message in such a way that any small change, distortion or error in the message text results in a completely different CRC value. The method of computation essentially involves the use of a shift register generator (implemented either in hardware or software) to divide a message polynomial (whose coefficients are just the bits of the message) by a specific CRC generator polynomial. The CRC value represents the coefficients of the remainder modulo the CRC generator polynomial. In the case of the 32-bit CCITT standard, the generator polynomial is $x^{32}+x^{26}+x^{23}+x^{22}+x^{16}+x^{12}+x^{11}+x^{10}+x^8+x^7+x^5+x^4+x^2+x+1$.

Our authentication method utilises the CRC concept. In particular, in the context of our example mixture (Geffe) generator, for any message M we can define $C_M=(C_{Mm}, C_{Mr}, C_{Mb})$ in which each of the three components denotes the generator state resulting from dividing the message text by the corresponding generator polynomial p(x). We do not describe here the method for utilising the shift register itself to perform the division, since it is well-documented elsewhere. $C_M$ then represents a value that is essentially equivalent to the message itself, up to multiples of p(x).

With this background, a method for secure authentication is as follows. Each participant in the communication system is assumed to possess exclusive knowledge of an authentication password P which is unique to that participant and which is registered with a public signature archive or other message authentication authority. The public signature archive or authentication authority possesses its own private key $D_S$ with its corresponding public key $E_S$ previously defined with reference to the public key cryptographic system that is the subject of this invention. When user B intends to sign a message M he is sending to user A, he calculates the generalised CRC value $C_M$ and forms a signature $S_M$ by appending $C_M$ to his authentication password $P_B$, and then encrypting the pair $(P_B, C_M)$ using the public key $E_S$ of the public signature archive. He then appends the signature $S_M$ to the message.

If the recipient of the message or a third party wishes to verify the authenticity of the signature $S_M$, he computes the generalised CRC value $C'_M$ for the actual message and submits it, together with the signature $S_M$ and the name or other information identifying user B, to the public signature archive or authentication authority for authentication. The public signature archive or authentication authority decrypts the signature using its private key $D_S$ and compares the generalised CRC value included therein with the value of $C'_M$, and compares the included password with the authentication password registered for user B. If both of these match, the public signature archive validates the signature as an authentic signature of message M by user B.

It can be seen from the foregoing that only the actual signer of the message can generate the signature $S_M$ since doing so requires knowledge of both user B's authentication password and the generalised CRC value of the message. Any attempt to duplicate one valid signature in order to sign additional messages is fruitless, since the encrypted generalised CRC value matches the one of the message to which it corresponds. An advantage of this method is that it does not require additional information to be inserted into the public authentication archive each time a message is to be signed.

An alternative preferred embodiment of the public-key authentication system will now be described. When user B intends to sign a message M he is sending to user A, he generates random numbers $S_{Mm}$, $S_{Mr}$ and $S_{Mb}$ and calculates $C_M+S_M$ and also $V_M=x^{S_M}$ mod p(x) for each component generator. User B then registers the pair $(C_M+S_M, V_M)$ under his name in the public signature archive, and "signs" the message by appending $S_M$ to the message header. If $V_m$ has already been registered in the public signature archive, user B repeats this process, computing a new $S_m$ and corresponding $V_m$, until a unique $V_m$ is determined. (That is, one which has not been previously registered in the public signature archive.)

In order to verify that the above process ensures an authentic "signature," observe first that anyone in possession of the message and able to inspect the public signature archive can compute the CRC value $C'_M$ for the actual message and add $S_M$ in order to verify that the result matches the value posted in the public signature archive. It is also possible for anyone to compute $V_M=x^{S_M}$ mod p(x) and to verify that it also matches the value posted in the public signature archive. However, assuming that our underlying encryption process is adequately secure (as will be discussed later), it would have been impossible for anyone other than user B to determine a signature $S_M$ that meets these requirements. As is common in other approaches to authentication, the possibility of generating a spurious message with the same CRC value(s) can be forestalled by insisting on a specific message structure or protocol, although the fact that the present approach utilises three or more different polynomials makes it highly unlikely that such precautions are required.

10. Multiplicative Congruential Generators as Component Generators

So-called multiplicative congruential generators (MCGs), or Lehmer generators, are widely used in computer systems as pseudorandom number generators. In the simplest variant of this type of generator, a sequence of numbers is generated using the relationship $x_n=cx_{n-1}$ (mod q), where q is a prime number and c is a constant integer between 2 and (q−1) chosen in such a way that c is a "primitive root of unity." The starting value or "seed" $x_0$ is selected arbitrarily. For example, q is sometimes chosen to be $2^{31}-1$, which is a convenient Mersenne prime, and c might be chosen as the integer 524287. The resulting sequence of integers between 1 and (q−1) has period (q−1), essentially being a permutation of all 31-bit integers except for the two whose binary representations are all zeroes or all ones.

Although these sequences have the attractive properties of being quick and easy to compute and having reasonably long periods, they have long been known to have poor statistical properties when used as pseudorandom number generators (unless they are nonlinearly "shuffled") and D. Knuth has published a detailed analysis of their inadequacy as keystream generators in cryptography. However, these weaknesses do not necessarily impair their usefulness as component generators in mixture generators of the types we have described, which have a highly nonlinear structure.

Assuming that an MCG is selected so that its modulus q is a Mersenne prime of the form $2^n-1$, the generator output comes in n-bit blocks. These can be viewed as a stream of bits starting with the low-order bit. "Clocking" or advancing an MCG a specified number of bits is accomplished by carrying out the appropriate number of integer exponentiations and multiplications modulo q to obtain the necessary block and then selecting the correct bit position within the block. Thus, for this type of component generator, integer multiplication modulo $2^n-1$ replaces polynomial multiplication modulo p(x). This procedure carries with it the need to perform arithmetic on quite large integers, but methods exist to perform this arithmetic reasonably efficiently, particularly when q is a Mersenne prime.

Using an MCG as the mixer generator can be accomplished either by utilising the binary state given by the contents of several fixed bit positions within the generator and discarding the rest (that is, clocking the MCG at a rate n times as fast as the generators whose outputs are being selected) or by using groups of successive bits in the MCG's bit stream output. An example of the latter approach is analogous to the one shown in FIG. 1, in which the MCG is used as a mixer to select among 8 other generators (whose structures are irrelevant here). The entire stream of bits coming from the MCG can be used, three bits at a time, to accomplish the selection.

11. Cryptographic Security

We will discuss in general terms both the security level afforded by the transformation from private keys to public keys and the properties of the ciphertext resulting from a simple XOR combination of the generator keystream output with the plaintext.

In terms of a so-called "chosen plaintext attack" against the private key, the security level of the proposed system corresponds directly to the computational difficulty of discovering a private key when its corresponding public key is known and the attacker has full knowledge of the cryptographic system and is able to apply it to generate a public key corresponding to any chosen private key. Assuming a generator structure such as the one shown in FIG. 2, the outputs of each of the 3 component MLSRGs can be viewed mathematically as elements of a finite field of order $2^p$ known as $GF(2^p)$. Since a different random initialisation key R is chosen for each message, the operation of advancing a generator in order to generate a public key corresponding to a given private key can be viewed as mathematically equivalent to exponentiation over $GF(2^p)$, and the inverse problem of finding the private key from the public key is mathematically equivalent to computing logarithms over $GF(2^p)$. The level of computational security of this part of the proposed system is therefore comparable to the difficulty of computing logarithms over $GF(2^p)$. Although in the late 1970's the best known algorithm for doing this required on the order of 2 operations, more recent progress in this field now indicates that using the best currently known method, only on the order of $2^{c\cdot\sqrt[3]{V+e.rad\ p.log^2 p}}+ee$ operations are required, where c is a "small" constant that has been empirically estimated as about 1.4 or 1.5. In the case when a (1,30,127) MLSRG is used, so that p=127, a comparison of these two quantities shows the difference between an exponent of about 63 in the first case as compared to about 26 or 27 in the second case. This means that computation of logarithms in $GF(2^{127})$, which would earlier have been effectively impossible, is now only moderately difficult, requiring only a few hours on a modern mainframe computer. In terms of the small example suggested earlier in this document, in which three MLSRGs of lengths 87, 89 and 127 were used in the Geffe configuration shown in FIG. 2, these figures imply that only a moderate level of computational security is obtained.

In the larger example suggested, using the same Geffe generator configuration but with MLSRG lengths of 89, 127 and 521, the public key system proposed here can still be easily implemented on a personal computer, but the level of computational security is much higher. Considering only the longest generator, of length 521, the above figures indicate that the number of operations needed to compute logarithms over $GF(2^{521})$ would be on the order of about $2^{50}$ using the best currently-known algorithm, which is believed to be near-optimal. Even assuming improvements of several orders of magnitude over present-day computers, the proposed public-key system will be computationally secure in these circumstances; that is, it will be infeasible to compute an unknown private key from all available information regardless of the computational resources brought to bear. Furthermore, still larger component generators can be used with only a modest increase in the computational effort required for encryption and decryption and without unduly burdening the public key file as a result of the additional key length, so that the security of the system can be increased to any desired level.

Using multiplicative congruential generators instead of shift register generators tends to increase the computational difficulty of the discrete logarithm problem, and therefore to enhance the security of the encryption procedure. This is because the logarithms must be computed over a field GF(q) where q is a prime rather than over $GF(2^p)$, and the best currently known algorithm for this case is less efficient, requiring on the order of $2^{c\cdot\sqrt{V+e.rad\ p.log\ p}}+ee$ operations when the modulus q is a Mersenne prime $2^p-1$. For example, this translates roughly into about $2^{40}\cong 10^{12}$ operations when p=127, several thousand times greater than in the case of $GF(2^p)$.

We now discuss the security of the system from the viewpoint of a "chosen plaintext" attack against the keystream generator and combining procedure described earlier. This type of attack is one in which a cryptanalyst has access to all public keys and has available a complete cryptographic system, including direct access to the keystream generator (the mixture generator in this case) that he can use to generate corresponding pairs of plaintext-ciphertext messages. This situation means that the cryptanalyst can inspect any number of subsequences of any length he chooses from the keystream output, starting from any desired initial state of the generator. Note that the period length of a mixture generator is very long (approximately $2^{303}$ even for the smaller of the Geffe configurations discussed).

By generating a large number of such portions of the keystream ("search fragments") and performing a sliding correlation between each of them and an unknown ciphertext, the cryptanalyst might try to discover "overlaps" which could be detected by statistical analysis. The likelihood of detectable overlaps depends upon the lengths of messages and the speed at which the generator can be run, but probabilistic analysis shows that the likelihood of any overlaps at all is extremely small. For example, even assuming that the generator is capable of being clocked at 1000 gigabits per second ($2^{40}$ bits per second), that the plaintext length averages one gigabit ($2^{30}$ bits) and that an overlap with a search fragment can be effectively detected instantaneously (i.e., in zero time) with a sliding correlator using search fragments only $2^{10}$ bits (one kilobit) long, then in the case of the smaller Geffe-type generator the expected time for "finding" a particular ciphertext is on the order of $2^{240}$ seconds!

A probabilistic analysis also shows that, under the same assumptions, the probability of any overlaps at all for messages corresponding to randomly chosen initialisation keys is negligible, so that a "known plaintext" attack based on this approach (the so-called "common birthday" problem) is also futile. In addition, even if portions of the plaintext corresponding to an unknown ciphertext are assumed to be known (or can be guessed) by the cryptanalyst, it is impossible to "extend" the keystream (in a manner analogous to the solution of a running key cipher) so as to solve for the remaining portions of the plaintext unless the length of such a known portion exceeds the "complexity" of the generator, which is 58193 bits even for the smaller of the Geffe generator configurations illustrated. Even this remote contingency can be addressed by limiting the maximum length of a plaintext to be enciphered under any single random initialisation key, segmenting longer messages when necessary, although the gain in security must be evaluated in the light of the consequent performance penalty.

A simpler form of correlation attack in which the analyst attempts to discover correlations between the output keystream and component generators has been discussed in the mathematical literature but is ineffective in the present system because of the very long periods of the component generators and their excellent autocorrelation and cross-correlation properties.

12. A Small Example

Figure 3:
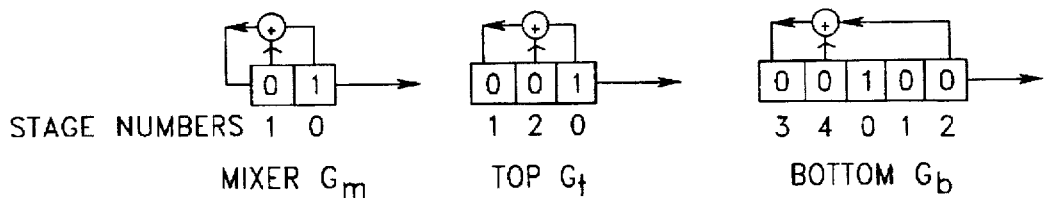
FIG. 3 is a diagrammatic representation of an example configuration of shift registers shown in FIG. 2.

Although it is useless for cryptographic purposes, for clarity we include a small example to illustrate the operation of the proposed system. This example will use MLSRG components in a Geffe configuration as shown in FIG. 2. The individual generators are shown in FIG. 3. The stage numbers indicate the power of x corresponding to the given stage.

The generator polynomials p(x) for these three generators are, respectively:

$1+x+x^2$, $1+x+x^3$, $1+x^3+x^5$

The entire output streams (i.e., full periods) of these three generators are:

| Mixer: | 1 0 1 |
| Top: | 1 0 0 1 0 1 1 |
| Bottom: | 0 0 1 0 0 0 0 1 0 1 1 1 0 1 1 0 0 0 1 1 1 1 1 0 0 1 1 0 1 |

TABLE 1

| Mixer | | Top | | Bottom | |
|---|---|---|---|---|---|
| State | 1 χ | State | 1 χ χ² | State | 1 χ χ²χ³χ⁴ |
| 0 1 | 1 0 | 0 0 1 | 1 0 0 | 0 0 1 0 0 | 1 0 0 0 0 |
| 1 0 | 0 1 | 1 0 0 | 0 1 0 | 0 0 0 1 0 | 0 1 0 0 0 |
| 1 1 | 1 1 | 0 1 0 | 0 0 1 | 0 0 0 0 1 | 0 0 1 0 0 |
| | | 1 0 1 | 1 1 0 | 1 0 0 0 0 | 0 0 0 1 0 |

TABLE 1-continued

| Mixer | | Top | | Bottom | |
|---|---|---|---|---|---|
| State | 1 χ | State | 1 χ χ² | State | 1 χ χ²χ³χ⁴ |
| | | 1 1 0 | 0 1 1 | 0 1 0 0 0 | 0 0 0 0 1 |
| | | 1 1 1 | 1 1 1 | 1 0 1 0 0 | 1 0 0 1 0 |
| | | 0 1 1 | 1 0 1 | 0 1 0 1 0 | 0 1 0 0 1 |
| | | | | 1 0 1 0 1 | 1 0 1 1 0 |
| | | | | 1 1 0 1 0 | 0 1 0 1 1 |
| | | | | 1 1 1 0 1 | 1 0 1 1 1 |
| | | | | 0 1 1 1 0 | 1 1 0 0 1 |
| | | | | 1 0 1 1 1 | 1 1 1 1 0 |
| | | | | 1 1 0 1 1 | 0 1 1 1 1 |
| | | | | 0 1 1 0 1 | 1 0 1 0 1 |
| | | | | 0 0 1 1 0 | 1 1 0 0 0 |
| | | | | 0 0 0 1 1 | 0 1 1 0 0 |
| | | | | 1 0 0 0 1 | 0 0 1 1 0 |
| | | | | 1 1 0 0 0 | 0 0 0 1 1 |
| | | | | 1 1 1 0 0 | 1 0 0 1 1 |
| | | | | 1 1 1 1 0 | 1 1 0 1 1 |
| | | | | 1 1 1 1 1 | 1 1 1 1 1 |
| | | | | 0 1 1 1 1 | 1 1 1 0 1 |
| | | | | 0 0 1 1 1 | 1 1 1 0 0 |
| | | | | 1 0 0 1 1 | 0 1 1 1 0 |
| | | | | 1 1 0 0 1 | 0 0 1 1 1 |
| | | | | 0 1 1 0 0 | 1 0 0 0 1 |
| | | | | 1 0 1 1 0 | 1 1 0 1 0 |
| | | | | 0 1 0 1 1 | 0 1 1 0 1 |
| | | | | 0 0 1 0 1 | 1 0 1 0 0 |
| | | | | 1 0 0 1 0 | 0 1 0 1 0 |
| | | | | 0 1 0 0 1 | 0 0 1 0 1 |

Table 1 above shows the complete sequences of states for these generators, and the corresponding polynomial coefficients (that is, the state but with the stages renumbered to match the appropriate powers of x). We should emphasize, however, that the sizes of the generators involved would make computation of Table 1 impossible in a practical sense and it is included here for illustrative purposes only. Sorting the columns of the table would effectively provide tables of logarithms modulo the generator polynomials.

Here the initial states are given by:

$$a_{m_0} = \begin{pmatrix} 0 \\ 1 \end{pmatrix}, a_{t_0} = \begin{pmatrix} 0 \\ 0 \\ 1 \end{pmatrix}, a_{b_0} = \begin{pmatrix} 0 \\ 0 \\ 1 \\ 0 \\ 0 \end{pmatrix}$$

Inspecting the stage numbers displayed in FIG. 3 shows that each of these states corresponds to the polynomial $$1 = 1 \cdot x^0 + \sum_{j=1}^{n-1} 0 \cdot x^j.$$

For each of the three component generators, the polynomial coefficients corresponding to binary powers of x are easily computed (modulo p(x)) as those given in Table 2 below. We again emphasize that the states corresponding to these powers are obtained simply by rotating (that is, renumbering) the bits appropriately.

TABLE 2

| | Mixer χᵏ | | Top χᵏ | | Bottom χᵏ | |
|---|---|---|---|---|---|---|
| Power k | State | 1 χ | State | 1 χ χ² | State | 1 χ χ²χ³χ⁴ |
| 2⁰ = 1 | 1 0 | 0 1 | 1 0 0 | 0 1 0 | 0 0 0 1 0 | 0 1 0 0 0 |
| 2¹ = 2 | 1 1 | 1 1 | 0 1 0 | 0 0 1 | 0 0 0 0 1 | 0 0 1 0 0 |

TABLE 2-continued

| Power k | Mixer $\gamma^k$ State 1 $\chi$ | Top $\gamma^k$ State 1 $\chi \chi^2$ | Bottom $\gamma^k$ State 1 $\chi \chi^2 \chi^3 \chi^4$ |
|---|---|---|---|
| $2^2 = 4$ | | 1 1 0    0 1 1 | 0 1 0 0 0    0 0 0 0 1 |
| $2^3 = 8$ | | | 1 1 0 1 0    0 1 0 1 1 |
| $2^4 = 16$ | | | 1 0 0 0 1    0 0 1 1 0 |

If we choose a private key of D=(3, 6, 24), the corresponding public key is computed as follows, using Table 2 extensively:

a) Since $D_m$=3 (11 in binary), we compute $x^3 = x^2 x^1$ by first loading the mixer generator with the state 1 1 corresponding to the polynomial $x^2$, then clocking it once to multiply by x, resulting in the state 0 1.
This gives $$E_m = \begin{pmatrix} 0 \\ 1 \end{pmatrix}.$$

b) Since $D_t$=6 (110 in binary), we compute $x^6 = x^4 x^2$ by first loading the top generator with the state 1 1 0 (polynomial coefficients 0 1 1) corresponding to the polynomial $x^4$, then clocking it twice to multiply by $x^2$, resulting in the state 0 1 1.
This gives $$E_t = \begin{pmatrix} 0 \\ 1 \\ 1 \end{pmatrix}.$$

c) Since $D_b$=24 (11000 in binary), we need to compute $x^{24} = x^{16} x^8$. This is slightly more complex than the previous cases, since the second factor $x^8$ corresponds to a polynomial with more than one nonzero coefficient. We see from Table 2 that $x^8 = 0.1 + 1x + 0x^2 + 1x^3 + 1x^4$ (that is, polynomial coefficients 0 1 0 1 1), so that we must load the generator three times with the state 1 0 0 0 1 corresponding to $x^{16}$, clocking it 1, 3 and 4 times respectively, to multiply by x, $x^3$ and $x^4$ since these are the powers of x that appear with nonzero coefficients in $x^8$, and then adding corresponding coefficients modulo 2. These 3 resulting states are:
1 1 0 0 0, 1 1 1 1 0, 1 1 1 1 1 and adding their corresponding coefficients modulo 2 gives a final state of 1 1 0 0 1.
This gives $$E_b = \begin{pmatrix} 1 \\ 1 \\ 0 \\ 0 \\ 1 \end{pmatrix}.$$

Now suppose that some other user wishes to send us a message by encrypting a plaintext of, say, the characters "AA", whose ASCII representation in binary is 01000001 01000001. The sender first generates a random initialisation key R. Various means for accomplishing this are possible, for example utilising a noisy diode. We suppose that R has been generated here as R=(2, 3, 7).

The sender's first task is to compute Q. This is done in the same fashion as computing E from D, and makes use of Table 2 as before.

d) $Q_m$ can be read directly from the $x^2$ line of the table as the state 1 1.

e) We obtain $Q_t$ by computing $x^3 = x^2 x$. The state of the top generator corresponding to $x^2$ is 0 1 0, and loading the generator with these contents and clocking it once to multiply by x results in the state 1 0 1.

f) To compute $Q_b$, we use Table 2 to compute $x^7 = x^4 x^2 x$ for the bottom generator. The last two of these powers contain only a single nonzero coefficient each, so it is easy to load the bottom generator with 0 1 0 0 0 (the state corresponding to $x^4$), clock the generator two times, and finally clock it one more time. The resulting state is 1 0 1 0 1.

The message header will then contain Q as follows (it may well contain additional message-specific information $$Q_m = \begin{pmatrix} 1 \\ 1 \end{pmatrix}, Q_t = \begin{pmatrix} 1 \\ 0 \\ 1 \end{pmatrix}, Q_b = \begin{pmatrix} 1 \\ 0 \\ 1 \\ 0 \\ 1 \end{pmatrix}$$

The next step is to calculate K. We do this by a similar exponentiation process, but this time raising polynomials corresponding to the components of the public key E to powers given by R.

g) First $K_m$ is obtained by raising the polynomial corresponding to $E_m$ to the power $R_m$=2. It happens in this example that $E_m$ corresponds to the zero-degree polynomial $$1 = 1 \cdot x^0 + \sum_{j=1}^{n-1} 0 \cdot x^j,$$

so that no work at all is required as, obviously, 1 raised to any power is still 1. Thus $K_m$ is the same as $E_m$, and corresponds to the state 0 1. This situation should never be expected to occur in practice. It has been caused by the choice of $D_m$ to be 3, equal to the period length of the mixer generator. This obviously poor choice for either D or R is simple to disallow when implementing the system.

h) Next we raise $E_t$ to the power $R_t$=3. To compute this, we need to build a table similar to Table 2, but listing the binary powers of $E_t$ rather than of x. For purposes of this example, we only need to compute $E_t^2$, since $E_t^3 = E_t^2 E_t$. Since $E_t$ is the state 0 1 1, corresponding to the polynomial $1+x^2$, we load the top generator with this state, clock it twice to obtain 1 0 0 and then add corresponding coefficients of these modulo 2 to get the state 111 corresponding to $E_t^2$. Then we use the generator again to multiply this by $E_t$. We do this by loading the generator with 1 1 1, clocking it twice to obtain 0 0 1 and adding coefficients of these modulo 2 to finally obtain 1 1 0 for $K_t$.

i) To compute $K_b$, we raise $E_b$ to the power $R_b$=7. Again we need to build a table similar to Table 2 to obtain $E_b^4$ and $E_b^2$, then compute $E_b^7 = E_b^4 . E_b^2 . E_b$. We have $E_b = 1$ 1 0 0 1=$x^2+x^3+x^4$, so we get $E_b^2$ as the modulo 2 sum of $E_b x^2 = 1$ 0 1 1 0, $E_b x^3 = 0$ 1 0 1 1 and $E_b x^4 = 0$ 0 1 0 1 (obtained by clocking the generator), which yields 1 1 0 0 0, corresponding to $x^3+x^4$. Squaring this gives $E_b^4$ as 1 0 0 0 0, eventually giving $K_b$ as 0 1 1 0 1.

The state K will therefore be given by:

$$K_m = \begin{pmatrix} 0 \\ 1 \end{pmatrix}, K_t = \begin{pmatrix} 1 \\ 1 \\ 0 \end{pmatrix}, K_b = \begin{pmatrix} 0 \\ 1 \\ 1 \\ 0 \\ 1 \end{pmatrix}$$

j) The output streams from the 3 generators starting from these states will be:

Mixer:   1 0 1 1 0 1 1 0 1 1 0 1 1 0 1 ...
Top:     0 1 1 1 0 0 1 0 1 1 1 0 0 1 0 1 1 1 0 0 1 ...
Bottom:  1 0 1 1 0 0 0 1 1 1 1 1 0 0 1 1 0 1 0 0 1 0 0 0 0 1 0 1 0 1 1 ...

k) The first 16 bits of the resulting (mixture) keystream will then be:

0 0 1 1 0 0 1 1 1 1 1 0 0 0 0 1 l) Computing the exclusive-OR of this stream with the plaintext will then yield the ciphertext:

0 1 1 1 0 0 1 0 1 0 1 0 0 0 0 0 m) The decryption process begins with the computation of K by raising the components of Q to powers given by the private key D. This exponentiation process is completely analogous to the procedures already illustrated in steps g), h) and i) above. Briefly, we have $$K_m = Q_m^{D_m} = Q_m^3 = \begin{pmatrix} 0 \\ 1 \end{pmatrix}, K_t = Q_t^{D_t} = Q_t^6 = Q_t^4 \cdot Q_t^2$$

and these last two factors corresponding to the states 1 1 1 and 0 1 1, respectively, so that $$K_t = \begin{pmatrix} 1 \\ 1 \\ 0 \end{pmatrix}.$$

Finally we can compute $K_b = Q_b^{D_b} = Q_b^{24} = Q_b^{16} \cdot Q_b^8$, calculating the latter two factors as corresponding to the respective states 1 1 1 1 0 and 0 1 1 0 0.
This gives the result $$K_b = \begin{pmatrix} 0 \\ 1 \\ 1 \\ 0 \\ 1 \end{pmatrix}$$

n) Since (as expected) the state K is the same as the one computed by the sender of the message, starting the mixture generator from this state produces the same keystream output as shown in steps j) and k) above, which can be XOR-ed with the ciphertext to recover the plaintext.

13. Randomisation and Key Management Issues

The present method involves a fairly high total number of key bits by comparison with existing systems. The U.S. Data Encryption Standard (DES), for example, utilises 56 bits for the key, whereas the Geffe generators used as examples above involve 87+89+127=303 key bits or 89+127+521= 737 key bits, equal to the sums of the lengths of the component generators. While these long keys provide high levels of security, their lengths are high enough to merit special key management techniques.

First, all cryptographic keys are best selected randomly, rather than as easily-remembered or systematically generated patterns, to protect against the more naive forms of cryptanalytic attacks. Well-known hardware means exist for generating true random bit streams, such as noisy diodes. Another approach is to use biometric methods. Since microsecond-resolution timing hardware is present on virtually all personal computers these days, an example of this is to record the time intervals between successive asynchronous human-generated events such as keystrokes. The low-order digits of the lengths of such intervals have acceptable randomness properties. In any case, it is important to attempt to select the random initialisation keys R in the present invention in as nearly as possible a truly random manner, since systematic or repeated use of such keys would severely compromise the security of the system.

The present invention envisages the use of another biometric technique, with a multi-dimensional (for example a two-dimensional) computer input device such as a pen, a drawing pad, a mouse or other pointing device, or a touch screen. A user can be requested to draw or "scribble" a random pattern, whereupon various possible attributes of the generated pattern can be used to obtain adequately random input. For example, when a mouse is available the low-order bits of the numbers representing the mouse coordinates at specified times may be suitable. Alternatively, the speeds of the mouse at particular times, or the time intervals between particular types of mouse events, or spatial properties (such as curvature) of the parametric curve traced by the mouse may be used.

In a preferred embodiment, a user can be requested to move a mouse pointer more or less randomly (that is, to "wave it" or "scribble" with it) within the area of a window displayed on a computer display screen for this purpose. The x and y coordinates of the positions of the mouse pointer sensed by the computer's operating environment at successive times can then be recorded as a succession of pairs of 16-bit binary numbers, until an adequate number of mouse movements has occurred. The first 25% and last 25%, for example, of these points can be discarded as being possibly insufficiently random, and then the low-order 4 bits of all the remaining 16-bit coordinate values can be extracted and concatenated to form the desired random number.

Care needs to be taken to ensure that quirks of the hardware and software do not distort or destroy randomness of the attributes being measured. For instance, in the Microsoft Windows operating environment, the timing resolution available for external events such as mouse or keyboard events is only 55 milliseconds, so that inter-event timings may turn out to be very non-random. Also, attempts to intercept or interfere with system timing information or mouse event processing must be guarded against, since such intrusions could represent a serious security threat.

While most pseudorandom number generators in common use on computer systems are not adequate for these needs, the keystream output of the mixture generators discussed in the present document have excellent randomness properties, and provide compromise approaches we discuss here. In particular, if a moderate number of the states in each component generator are initialised from a truly random source and the generator is then run (or advanced) for a brief time (say, 1000 clock cycles), the resulting final generator state will be statistically indistinguishable from a true random state. We refer to this process as "key hashing." The high complexity of the generators described here makes this a reasonable alternative to other means that have been suggested, such as the use of a DES chip or algorithm in so-called "counter" mode.

The storage and management of cryptographic keys must be addressed, although a public-key system is inherently less dependent upon such factors for its security than conventional or private-key systems. If a private key is stored anywhere in a computer or data storage system, physical security becomes an important issue. In some applications, electromagnetic emissions of the cryptographic equipment or computer must be considered. While compact storage is possible on portable media such as magnetic or optically-encoded cards, cost or other considerations may dictate that keys must either consist of or be able to be generated easily from data (for example, a password) which is to reside solely in human memory. Since conventional alphanumeric symbols provide only between 5 and 6 bits of information per character, and since typical passwords are limited to no more than 8 to 10 characters, no more than 50 to 60 key bits can be supplied in this manner.

The present invention envisages initialising a limited number of stages of the component generators of a mixture generator with key bits obtained from a password and then imitating the approach mentioned above, running or advancing the generators for a brief time to simulate a random key. Such a system may be vulnerable to cryptanalytic "key cluster" attacks or the like, but by extending the number of clock cycles used in the initialisation or "hashing" phase and introducing nonlinearities like "stutter" (to inhibit rapid advancing of the generators and thus limit the rate at which trial keys can be generated) security can be enhanced.

INDUSTRIAL APPLICABILITY

The encryption system of the present invention has application in most areas where secure communications are required with the advantages which flow from a true public key system. Non-limiting examples include:

(1) the secure transfer of personal or financial information, including credit card numbers or authorisations, over public networks such as the Internet, to eliminate the risk of theft or misuse of such information, (2) the transmission of secure voice communications over existing computer networks, including the Internet, or over public switched lines, to ensure the privacy of such communications. In this application, digitised and/or compressed voice data can be encrypted in real time without the need for prior contact or prearrangement of a secret "key", (3) ensuring the privacy of electronic mail or facsimile communications over either public switched lines or computer networks, including the Internet.

ADVANTAGES

Known cryptanalytic difficulty

The difficulty of successful cryptanalysis of the present algorithms can be assessed in quantitative terms. It is possible to "tailor" this difficulty to any desired level by a straightforward choice of system parameters depending upon the intended field of application.

High speed

Whether implemented in software or hardware, the present algorithms allow the following tasks to be accomplished as quickly as possible:

a) Generating a public key from an arbitrarily chosen private key b) Encryption of an arbitrary plaintext bit stream c) Decryption of an encrypted ciphertext.

High security

The system is capable and provable of offering very high security, in terms of modern cryptographic standards and methods, against sophisticated modern cryptanalytic attacks.

Minimum length of ciphertext

To prevent inefficiencies in transmission, the system produces ciphertext whose length is substantially equivalent to the length of the plaintext.

Non-deterministic

Even if the system is required to encrypt an identical plaintext more than once using the same public key, each resulting ciphertext differs from the others in a non-systematic way in order to deter compilation of a "codebook" and to foil other cryptanalytic attacks.

Simplicity and efficiency of implementation

The essential computations required to implement the system are able to be accomplished either in hardware or software while making a minimum of demands on computational equipment. This facilitates implementation in embedded systems, custom or dedicated hardware or "smart cards," as well as in software running on widely available processors.

I claim:

1. A public-key encryption system wherein a message sender encrypts a plaintext message P using a publicly known key unique to a message receiver and the message receiver decrypts the encrypted message using a secret private key from which the public key has been derived, characterised in that:

(1) a private key (D) is selected which comprises a plurality of binary numbers $D_{1\ to\ n}$;

(2) a public key (E) is computed by exponentiation (as hereinbefore defined) using the private key by, for each of the said numbers $D_{1\ to\ n}$, calculating the state of a pseudo-random binary number generator from a given and known initial state after a number of clock pulses or state transitions equal to the corresponding number given by the private key $D_{1\ to\ n}$ and providing each of the calculated binary states $E_{1\ to\ n}$ as a component of the public key E;

(3) the message sender (a) generates a random initialisation key (R) comprising a set of binary numbers $R_{1\ to\ n}$ and computes by exponentiation an open key Q by, for each of the numbers $R_{1\ to\ n}$, calculating the state of a pseudo-random binary number generator from a given and known initial state after a number of clock pulses or state transitions equal to the corresponding number given by the random initialisation key $R_{1\ to\ n}$ and providing each of the calculated binary states $O_{1\ to\ n}$ as a component of the open key Q, (b) exponentiates the components of the public key E by the components of the random initialisation key R to produce generator initialisation states $K_{1\ to\ n}$ by, for each of the said numbers $E_{1\ to\ n}$ and $R_{1\ to\ n}$, calculating the state of a pseudo-random binary number generator that would result from applying the process defined in step (2) a number of times equal to the corresponding binary number $R_{1\ to\ n}$, (c) loads a set (n) of pseudo-random binary number generators, the outputs of which are combined to form a first mixture generator, with initial values $K_{1\ to\ n}$, (d) clocks the first mixture generator to obtain a keystream serial output, (e) combines said keystream output with the binary plaintext message P to produce an encrypted bit stream ciphertext C, (f) adds the ciphertext C to the open key Q to produce a message stream, (g) transmits the message to the message receiver;

(4) the message receiver
  (a) extracts the open key Q from the message stream.
  (b) exponentiates the open key Q by the private key D to derive generator initialisation states $K_{1\ to\ n}$ by, for each of the said numbers $Q_{1\ to\ n}$ and $D_{1\ to\ n}$, calculating the state of a pseudo-random binary number generator that would result from applying the process defined in step (3)(a) a number of times equal to the corresponding binary number $D_{1\ to\ n}$;
  (c) loads a second set (n) of pseudo-random binary number generators, the outputs of which are combined to form a mixture generator, with the generator initialisation states $K_{1\ to\ n}$;
  (d) clocks the mixture generator to obtain a keystream serial output and combines this output with the received encrypted bit stream to produce the sender's plaintext message.

2. A public key encryption system according to claim 1 wherein said mixture generator comprises a set (n) of maximal period linear shift registers, with one generator in the set arranged to pseudo-randomly select the output of one of the remaining (n−1) members of the set each time it is clocked to provide said keystream serial output.

3. A public key encryption system according to claim 1 wherein generating said random initialisation key R comprises the steps:
  (1) manipulating an electronic pointer device whose state at any time t can be described as a point $X_t$ represented by a plurality of coordinates $(X_{t1}, X_{t2}, \ldots X_{tm})$;
  (2) measuring the points $X_t$ describing the states of said input device at a plurality of time instants t=1, 2, ...., n;
  (3) selecting a subset of the points thus measured corresponding to a subset of said time instants;
  (4) computing a numerical function of the coordinates of all the points thus selected;
  (5) producing the desired random numbers as the plurality of binary digits which represent the value of the numerical function thus computed.

4. A public key encryption system according to claim 1 wherein combining said keystream with the binary plaintext P to produce said ciphertext C, comprises the steps of, for each component of P, $P_i$:
  (1) generating a pseudorandom permutation T of the bytes 1, ..., $n_i$ using a plurality of bytes of the serial keystream output;
  (2) permuting the relative positions of the bytes $n_i$ within the part $P_i$ according to the permutation T to form an intermediate part $I_i$;
  (3) forming the i-th part $C_i$ of the encrypted bit stream by for each byte B of the intermediate part $I_i$;
    (a) generating one or more bytes of the serial keystream output; and
    (b) replacing the byte B with a quantity that depends upon the byte B and the said generated byte or bytes of the serial keystream output.

5. A public key encryption system according to claim 4 including the steps of for each successive part $P_i$ computing a cumulative current message digest value $D_i$ for all parts of the binary information P from its beginning up to and including $P_i$; and
  obtaining and discarding a number of additional bytes of the serial keystream output, said number depending upon the current message digest value $D_i$.

6. Encryption apparatus for a public key encryption system in which a private key (D) is selected which comprises a plurality of binary numbers $D_{1\ to\ n}$ and a public key (E) is exponentiated using the private key by, for each of the said numbers $D_{1\ to\ n}$, calculating the state of a pseudo-random binary number generator from a given initial state after a number of clock pulses or state transitions equal to the corresponding number given by the private key $D_{1\ to\ n}$, and providing each of the calculated binary states $E_{1\ to\ n}$ as a component of the public key E, said apparatus comprising:

means for generating a random initialisation key (R) comprising a set of binary numbers $R_{1\ to\ n}$;
  means for calculating by exponentiation an open key Q by, for each of the said numbers $R_{1\ to\ n}$, calculating the state of a pseudo-random binary number generator from a given and known initial state after a number of clock pulses or state transitions equal to the corresponding number given by the random initialisation key $R_{1\ to\ n}$ and providing each of the calculated binary states $Q_{1\ to\ n}$ as a component of the open key Q;
  means for exponentiating the components of the public key E by the components of the random initialisation key R to produce generator initialisation states $K_{1\ to\ n}$ by, for each of the said numbers $E_{1\ to\ n}$ and $R_{1\ to\ n}$, calculating the state of a pseudo-random binary number generator that would result from applying the process used to exponentiate public key (E) a number of times equal to the corresponding binary number $R_{1\ to\ n}$;
  a mixture generator comprising a set (n) of pseudo-random binary number generators, the outputs of which are combined to form the output of the mixture generator;
  means which load said set (n) of pseudo-random binary number generators with initial values equal to $K_{1\ to\ n}$;
  means which clock the mixture generator to obtain a keystream serial output;
  means which receive a plaintext message and combine the output of the mixture generator with the binary plaintext message to produce an encrypted bit stream;
  means for adding the ciphertext C to the open key Q to produce a message stream, and
  means for transmitting the message stream to the message receiver.

7. Decryption apparatus for a public-key encryption system in which a private key (D) is selected which comprises a plurality of binary numbers $D_{1\ to\ n}$ and a public key (E) is exponentiated using the private key by, for each of the said numbers $D_{1\ to\ n}$, calculating the state of a pseudo-random binary number generator from a given initial state after a number of clock pulses or state transitions equal to the corresponding number given by the private key $D_{1\ to\ n}$, and providing each of the calculated binary states $E_{1\ to\ n}$ as a component of the public key E, and wherein a plaintext message is encrypted according to a process whereby the message sender
  (1) generates a random initialisation key (R) comprising a set of binary numbers $R_{1\ to\ n}$ and computes by exponentiation an open key Q by for each of the said numbers $R_{1\ to\ n}$, calculating the state of a pseudo-random binary number generator from a given and known initial state after a number of clock pulses or state transitions equal to the corresponding number given by the random initialisation key $R_{1\ to\ n}$ and providing each of the calculated binary states $Q_{1\ to\ n}$ as a component of the open key Q;
  (2) exponentiates the components of the public key E by the components of the random initialisation key R to produce generator initialisation states $K_{1 \text{ to } n}$ by, for each of the said numbers $E_{1 \text{ to } n}$ and $R_{1 \text{ to } n}$, calculating the state of a pseudo-random binary number generator that would result from applying the process previously defined, wherein a private key is used to exponentiate a public key, a number of times equal to the corresponding binary number $R_{1 \text{ to } n}$;

(3) loads a set (n) of pseudo-random binary number generators, the outputs of which are combined to form a mixture generator, with initial values $K_{1 \text{ to } n}$;

(4) clocks the mixture generator to obtain a keystream serial output and combines this output with the binary plaintext message to produce an encrypted bit stream ciphertext C, and (5) transmits the encrypted bit stream together with the open key Q to the message receiver, said decryption apparatus comprising:

means for extracting the open key Q from the encrypted bit stream;

means for exponentiating the components of the open key Q by the components of the private key D to derive generator initialisation states $K_{1 \text{ to } n}$ by, for each of the said numbers $Q_{1 \text{ to } n}$ and $D_{1 \text{ to } n}$, calculating the state of a pseudo-random binary number generator that would result from applying the process defined above for deriving the open key Q a number of times equal to the corresponding binary number $D_{1 \text{ to } n}$;

a set (n) of pseudo-random binary number generators, the outputs of which are combined to form a mixture generator;

means which load said set (n) of pseudo-random binary number generators with initial values equal to $K_{1 \text{ to } n}$;

means for clocking the mixture generator to obtain a keystream serial output;

and means for combining this output with the received ciphertext C to produce the plaintext message P.

8. A public-key authentication system wherein a message sender appends signature information to a message and registers corresponding authentication information together with his name in a signature archive that is open to public inspection and wherein a message verifier obtains the message and its signature information, and the authentication information from the public signature archive and uses these to confirm whether or not the message has been sent by the sender identified by said signature information, characterised in that:

(1) the message sender (a) selects a random digital signature (S) consisting of a plurality of binary numbers $S_{1 \text{ to } n}$;

(b) exponentiates a verification key V by, for each of said numbers $S_{1 \text{ to } n}$, by calculating the state of a pseudo-random binary number generator from a given initial state after a number of clock pulses or state transitions equal to the corresponding number given by the random digital signature $S_{1 \text{ to } n}$ and providing each of the calculated binary states $V_{1 \text{ to } n}$ as a component of the verification key V;

(c) checks said signature archive to ensure that the verification key V computed in (b) has not yet been registered and if V has previously been registered repeats steps (a) and (b);

(d) computes a generalised cyclic redundancy check (CRC) value C by, for each one of a set (n) of pseudo-random binary number generators, computing the remainder resulting from dividing the sequence of bits comprising the message being sent by a modulus corresponding to said pseudo-random binary number generator and providing each such remainder $C_{1 \text{ to } n}$ as a component of the generalised CRC value C;

(e) computes the sum C+S (modulo 2) and registers this sum and the verification key V under his name in the public signature archive;

(f) appends S to the message being sent, and (2) the message verifier (a) extracts the digital signature (S) consisting of a plurality of binary numbers $S_{1 \text{ to } n}$ from the message;

(b) computes a generalised cyclic redundancy check (CRC) value C by, for each of the said numbers $S_{1 \text{ to } n}$, computing the remainder resulting from dividing the sequence of bits comprising the received message by a modulus corresponding to a pseudo-random binary number generator and providing each such remainder $C_{1 \text{ to } n}$ as a component of the generalised CRC value C;

(c) computes a verification key V by, for each of said numbers $S_{1 \text{ to } n}$, exponentiating a given initial state of the corresponding pseudo-random binary number generator using each said number $S_{1 \text{ to } n}$ by means of the process defined in step (1)(b);

(d) computes the sum C+S (modulo 2);

(e) searches the public signature archive under the name of the sender identified by said signature information of the message for authentication information matching the values C+S (modulo 2) and V computed in (c) and (d);

(f) validates the message as authentic if the search in (e) is successful, or rejects it as spurious if the search in (e) is unsuccessful.

9. A public-key authentication system wherein a message authenticator selects a private key D which comprises a plurality of binary numbers $D_{1 \text{ to } n}$ and exponentiates a public key E using the private key by, for each of the said numbers $D_{1 \text{ to } n}$, calculating the state of a pseudo-random binary number generator from a given initial state after a number of clock pulses or state transitions equal to the corresponding number given by the private key $D_{1 \text{ to } n}$ and providing each of the calculated binary states $E_{1 \text{ to } n}$ as a component of the public key E, and makes E available for public inspection, and wherein a message sender registers unique authentication information with said message authenticator and appends signature information to a message, and wherein a message verifier obtains the message, calculates a generalised CRC value for the message, submits the message signature information, the generalised CRC value and the sender's name or other identifying information to the message authenticator, and wherein said message authenticator uses said generalised CRC value, said message signature information and said registered authentication information to confirm whether or not the message has been sent by the sender identified by said authentication information, characterised in that:

(1) the message sender (a) selects an authentication password (P) consisting of a plurality of binary numbers;

(b) requests said signature authenticator to register the authentication password P to correspond to his name or other identifying information and to confirm that P has not yet been registered by anyone and if informed that P has previously been registered repeats step (a);

(c) computes a generalised cyclic redundancy check (CRC) value $C_M$ by, for each one of a set (n) of pseudo-random binary number generators, computing the remainder resulting from dividing the sequence of bits comprising the message being sent by a modulus corresponding to said pseudo-random binary number generator and providing each such remainder $C_{1\ to\ n}$ to as a component of the generalised CRC value $C_M$;

(d) computes intermediate signature information by appending the generalised CRC value $C_M$ to the authentication password P;

(e) computes message signature information $S_{P,M}$ by encrypting the intermediate signature information computed in step (d) using the signature authenticator's public key E by (i) selecting a random initialisation key (R) comprising a set of binary numbers $R_{1\ to\ n}$ and exponentiating the initial state using each number by, for each of the said numbers $R_{1\ to\ n}$, calculating the state of pseudo-random binary number generator from a given initial state after a number of clock pulses or state transitions given by the random initialisation key $R_{1\ to\ n}$ and providing each of the calculated binary states $Q_{1\ to\ n}$ to produce an open key Q.

(ii) exponentiating the components of the signature authenticator's public key E by the components of the random initialisation key R to produce generator initialisation states $K_{1\ to\ n}$ by, for each of the said numbers $E_{1\ to\ n}$ and $R_{1\ to\ n}$, calculating the state of a pseudo-random binary number generator that would result from applying the process previously defined, wherein a private key is used to exponentiate a public key, a number of times equal to the corresponding binary number $R_{1\ to\ n}$;

(iii) loading a set (n) of pseudo-random binary number generators, the outputs of which are combined to form a mixture generator, with initial values $K_{1\ to\ n}$;

(iv) clocking the mixture generator to obtain a keystream serial output and combining this output with said intermediate signature information to produce encrypted intermediate signature information, (v) appending said encrypted intermediate signature information to said open key Q to produce message signature information $S_{P,M}$.

(f) appending the said message signature information $S_{P,M}$ to the message and also appending his name or other identifying information to the message, (2) the message verifier (a) extracts the message signature information ($S_{P,M}$) and the sender's name or other identifying information from the message;

(b) computes a generalised CRC value $C'_M$ for the message by means of the process defined in step (1)(c);

(c) submits the said message signature information and the sender's name or other identifying information and the said generalised CRC value $C'_M$ to the signature authenticator and requests said signature authenticator to compare the authentication password P and generalised CRC value $C_M$ encrypted within the message signature information $S_{P,M}$ with $C'_M$ and the sender's name or other identifying information, and (3) the message authenticator (a) decrypts the message signature information $S_{P,M}$ using its private key D by (i) extracting the open key Q from the message signature information, (ii) exponentiating the open key Q by the private key D to derive generator initialisation states $K_{1\ to\ n}$ by, for each of the said numbers $Q_{1\ to\ n}$ and $D_{1\ to\ n}$, calculating the state of a pseudo-random binary number generator that would result from applying the process defined in step (1)(e)(i) a number of times equal to the corresponding binary number $D_{1\ to\ n}$;

(iii) loading a second set (n) of pseudo-random binary number generators, the outputs of which are combined to form a mixture generator, with the generator initialisation states $K_{1\ to\ n}$;

(iv) clocking the mixture generator to obtain a keystream serial output and combining this output with the message signature information to thereby recover the intermediate signature information P and C computed in step (1)(d);

(b) compares the value of P contained in said intermediate signature information with the authentication password registered as corresponding to the name or other identifying information submitted in step (2)(c);

(c) compares the value of $C_M$ contained in said intermediate signature information with the value of $C'_M$ submitted in step (2)(c);

(d) confirms to the message verifier that the message is authentic if both of the comparisons in steps (c) and (d) are successful, or rejects it as spurious if either comparison fails.

10. A method for generating random numbers comprising the steps of:

(1) manipulating an electronic pointer device whose state at any time t can be described as a point $X_t$ represented by a plurality of coordinates $(X_{t1}, X_{t2}, \ldots X_{tm})$;

(2) measuring the points $X_t$ describing the states of said input device at a plurality of time instants $t=1, 2, \ldots, n$;

(3) selecting a subset of the points thus measured corresponding to a subset of said time instants;

(4) computing a numerical function of the coordinates of all the points thus selected;

(5) producing the desired random numbers as the plurality of binary digits which represent the value of the numerical function thus computed.

11. A method of combining a serial keystream output with binary information P, comprising a succession of parts $P_1, \ldots, P_N$ in which each part $P_i$ represents a number of bytes $n_i$, to produce an encrypted bit stream C comprising a succession of parts $C_i$, said method comprising the steps of, for each successive part $P_i$:

(1) generating a pseudorandom permutation T of the bytes $1, \ldots, n_i$ using a plurality of bytes of the serial keystream output;

(2) permuting the relative positions of the bytes $n_i$ within the part $P_i$ according to the permutation T to form an intermediate part $I_i$;

(3) forming the i-th part $C_i$ of the encrypted bit stream by for each byte B of the intermediate part $I_i$;

(a) generating one or more bytes of the serial keystream output; and (b) replacing the byte B with a quantity that depends upon the byte B and the said generated byte or bytes of the serial keystream output.

12. A method of combining a serial keystream with binary information according to claim 11 including the steps of for each successive part $P_i$ computing a cumulative current message digest value $D_i$ for all parts of the binary information P from its beginning up to and including $P_i$; and obtaining and discarding a number of additional bytes of the serial keystream output, said number depending upon the current message digest value $D_i$.

13. A method of combining a serial keystream output with an encrypted bit stream C comprising a succession of parts $C_1, \ldots, C_N$, in which each part $C_i$ consists of a number of bytes $n_i$, to recover binary information P containing by a succession of parts $P_i$, said method comprising the steps of for each successive part $C_i$:

(1) generating a pseudorandom permutation T of the numbers $1, \ldots n_i$ using a plurality of bytes of the serial keystream output;

(2) forming an intermediate part $I_i$ by for each byte B of the part $C_i$
   (a) generating one or more bytes of the serial keystream output; and
   (b) replacing the byte B with a quantity that depends upon the byte B and the said generated byte or bytes of the serial keystream output; and (3) permuting the relative positions of the bytes within the intermediate part $I_i$ according to the permutation T to form the i-th part $P_i$ of said binary information.

14. A method of combining a serial keystream with an encrypted bit stream according to claim 13 including the steps of for each successive part $P_i$ computing a current message digest value $D_i$ for all parts of the binary information P from its beginning up to and including $P_i$; and obtaining and discarding a number of additional bytes of the serial keystream output, said number depending upon the current message digest value $D_i$.

15. A mixture generator suitable for use in a public key encryption system comprising:

a set (n) of maximal period linear shift registers, means for selecting the output from one of n−1 of said generators to provide the output of the mixture generator, decoding means for decoding the outputs of a plurality m of the last stages of the nth generator, said decoder output controlling said selecting means to determine its selection of the particular generator output to use.

16. A mixture generator according to claim 15 wherein n=3 and m=1.

17. A public key encryption system according to claim 1 wherein said mixture generator comprises a set (n) of multiplicative congruential generators, with one generator in the set arranged to pseudo-randomly select the output of one of the remaining (n−1) members of the set each time it is clocked to provide said keystream output.

18. A mixture generator suitable for use in a public key encryption system comprising:

a set (n) of multiplicative congruential generators, means for selecting the output from one of n−1 of said generators to provide the output of the mixture generator, decoding means for decoding the outputs of a plurality m of the last stages of the nth generator, said decoder output controlling said selecting means to determine its selection of the particular generator output to use.

19. A mixture generator according to claim 18 wherein n=3 and m=1.

* * * * *